United States Patent
Aboul-Magd et al.

(10) Patent No.: US 11,425,753 B2
(45) Date of Patent: Aug. 23, 2022

(54) SYSTEMS AND METHODS FOR OUT-OF-BAND FULL DUPLEX COMMUNICATIONS

(71) Applicant: Huawei Technologies Co., Ltd., Shenzhen (CN)

(72) Inventors: Osama Aboul-Magd, Ottawa (CA); Yan Xin, Ottawa (CA); Jung Hoon Suh, Ottawa (CA)

(73) Assignee: Huawei Technologies, Co., Ltd., Shenzhen (CN)

( * ) Notice: Subject to any disclaimer, the term of this patent is extended or adjusted under 35 U.S.C. 154(b) by 138 days.

(21) Appl. No.: 16/555,848

(22) Filed: Aug. 29, 2019

(65) Prior Publication Data
US 2021/0068152 A1    Mar. 4, 2021

(51) Int. Cl.
| | |
|---|---|
| *H04W 74/08* | (2009.01) |
| *H04L 5/00* | (2006.01) |
| *H04L 5/14* | (2006.01) |
| *H04W 72/04* | (2009.01) |

(52) U.S. Cl.
CPC ....... *H04W 74/0808* (2013.01); *H04L 5/0055* (2013.01); *H04L 5/14* (2013.01); *H04W 72/0446* (2013.01)

(58) Field of Classification Search
CPC .......... H04W 74/0808; H04W 72/0446; H04L 5/0055; H04L 5/14
See application file for complete search history.

(56) References Cited

U.S. PATENT DOCUMENTS

| | | | | |
|---|---|---|---|---|
| 7,965,681 | B2 * | 6/2011 | Berglund | H04W 72/082 370/329 |
| 8,965,390 | B2 * | 2/2015 | Morrison | H04W 28/0231 455/452.2 |
| 9,426,815 | B2 * | 8/2016 | Ericson | H04W 72/0486 |

(Continued)

FOREIGN PATENT DOCUMENTS

CN    108353418 A    7/2018

OTHER PUBLICATIONS

Apple Inc. Channel Access Procedures for NR-U, 3GPP TSG RAN WG1 Meeting #94 R1-1808611, Gothenburg, Sweden, 5 pages. Aug. 2018.

*Primary Examiner* — Brian T O'Connor
(74) *Attorney, Agent, or Firm* — Slater Matsil, LLP

(57) ABSTRACT

Systems and methods for emulating Full Duplex (FD) transmissions between two or more devices by way of out-of-band Full Duplex communication, also known as Frequency Division Duplexing-Full Duplex (FDD-FD) communication. FD communication refers to a wireless communication device being able to transmit and receive communications at the same time. In out-of-band FD communication, a first communication channel is used for transmitting a first communication in one direction and a second communication channel is used for simultaneously transmitting a second communication in the reverse direction. Examples relate to management frames for managing channel availability and channel selection for implementing the out-of-band FD communication. An example wi-fi management frame includes an identification of both the first channel for the wireless communication device to transmit on, and the second channel for the wireless communication device to simultaneously receive on.

26 Claims, 13 Drawing Sheets

(56) References Cited

U.S. PATENT DOCUMENTS

| | | | |
|---|---|---|---|
| 10,201,016 B2* | 2/2019 | Dabeer | H04W 74/0833 |
| 10,462,805 B2* | 10/2019 | Belghoul | H04W 72/0446 |
| 10,666,414 B2* | 5/2020 | Mishra | H04L 5/14 |
| 10,904,877 B2* | 1/2021 | Bontu | H04L 5/001 |
| 11,044,635 B2* | 6/2021 | Belghoul | H04W 72/1252 |
| 2014/0334320 A1* | 11/2014 | Liu | H04L 5/0098 |
| | | | 370/252 |
| 2014/0335883 A1* | 11/2014 | Ericson | H04L 5/001 |
| | | | 455/452.2 |
| 2016/0095110 A1* | 3/2016 | Li | H04W 72/1215 |
| | | | 370/329 |
| 2016/0128080 A1* | 5/2016 | Verma | H04L 1/0027 |
| | | | 370/336 |
| 2018/0035318 A1 | 2/2018 | Liu | |
| 2018/0212744 A1* | 7/2018 | Mishra | H04L 5/14 |
| 2018/0317259 A1* | 11/2018 | Islam | H04W 74/0816 |
| 2020/0068605 A1* | 2/2020 | Golitschek Edler Von Elbwart | H04W 72/1289 |
| 2020/0146098 A1* | 5/2020 | Dhanapal | H04W 74/0816 |
| 2020/0260463 A1* | 8/2020 | Lovlekar | H04W 36/14 |
| 2020/0287701 A1* | 9/2020 | Mishra | H04L 5/14 |
| 2020/0382992 A1* | 12/2020 | Shilov | H04W 28/0289 |
| 2021/0050946 A1* | 2/2021 | Subramanian | H04W 76/15 |
| 2021/0076416 A1* | 3/2021 | Shah | H04W 74/006 |

* cited by examiner

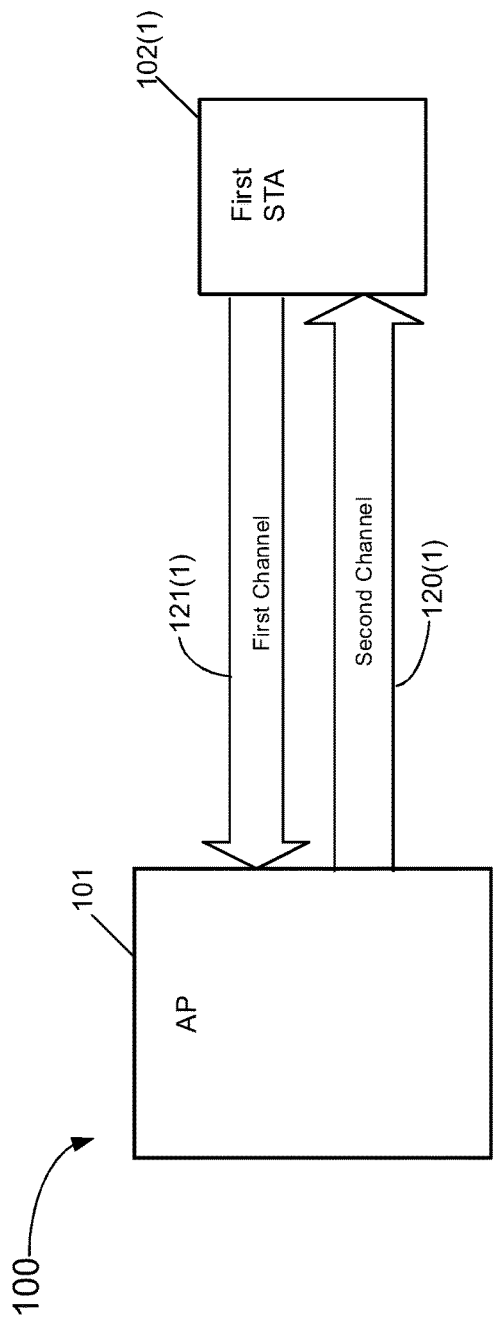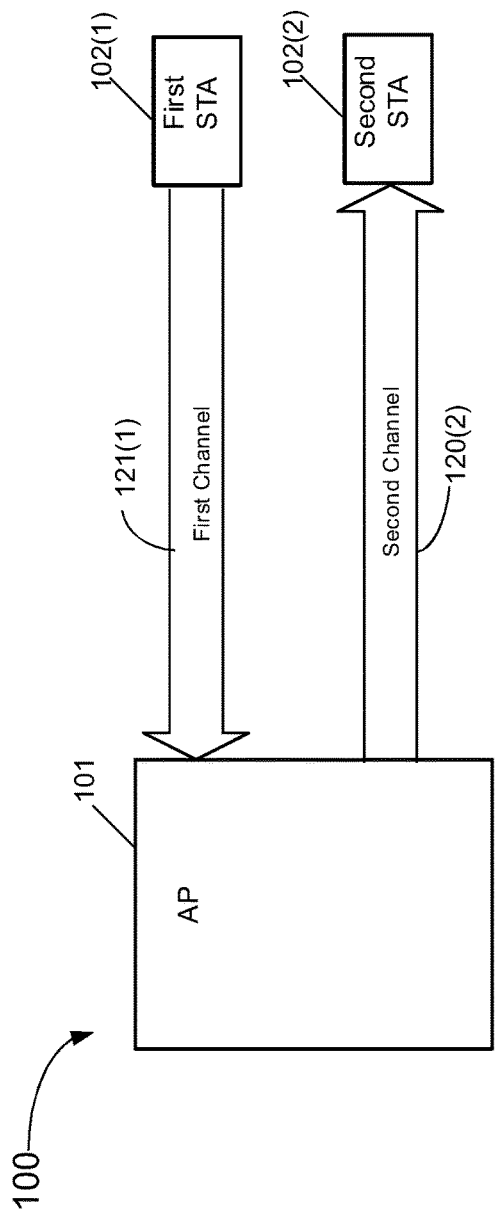

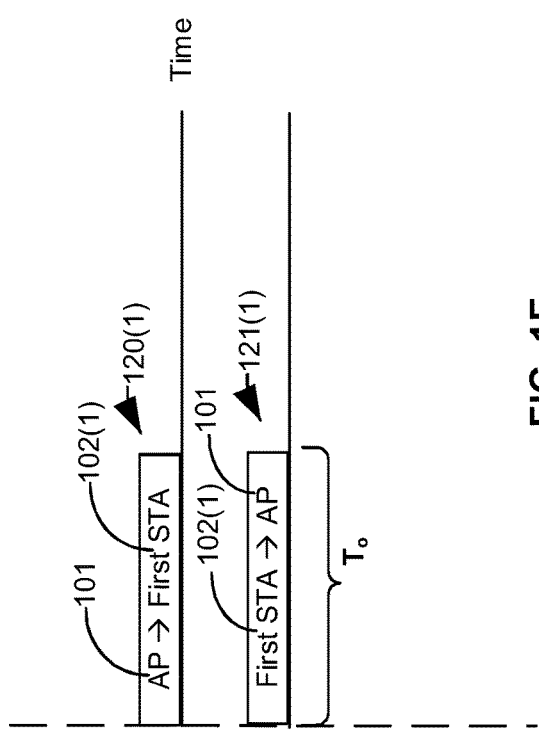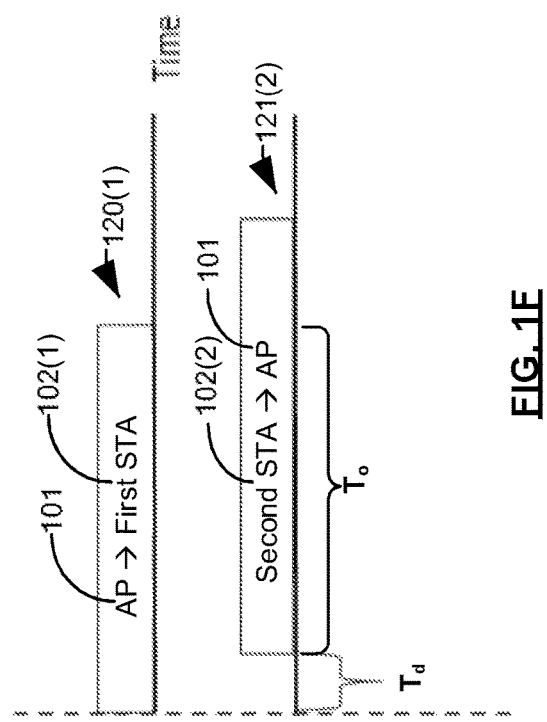
FIG. 1E

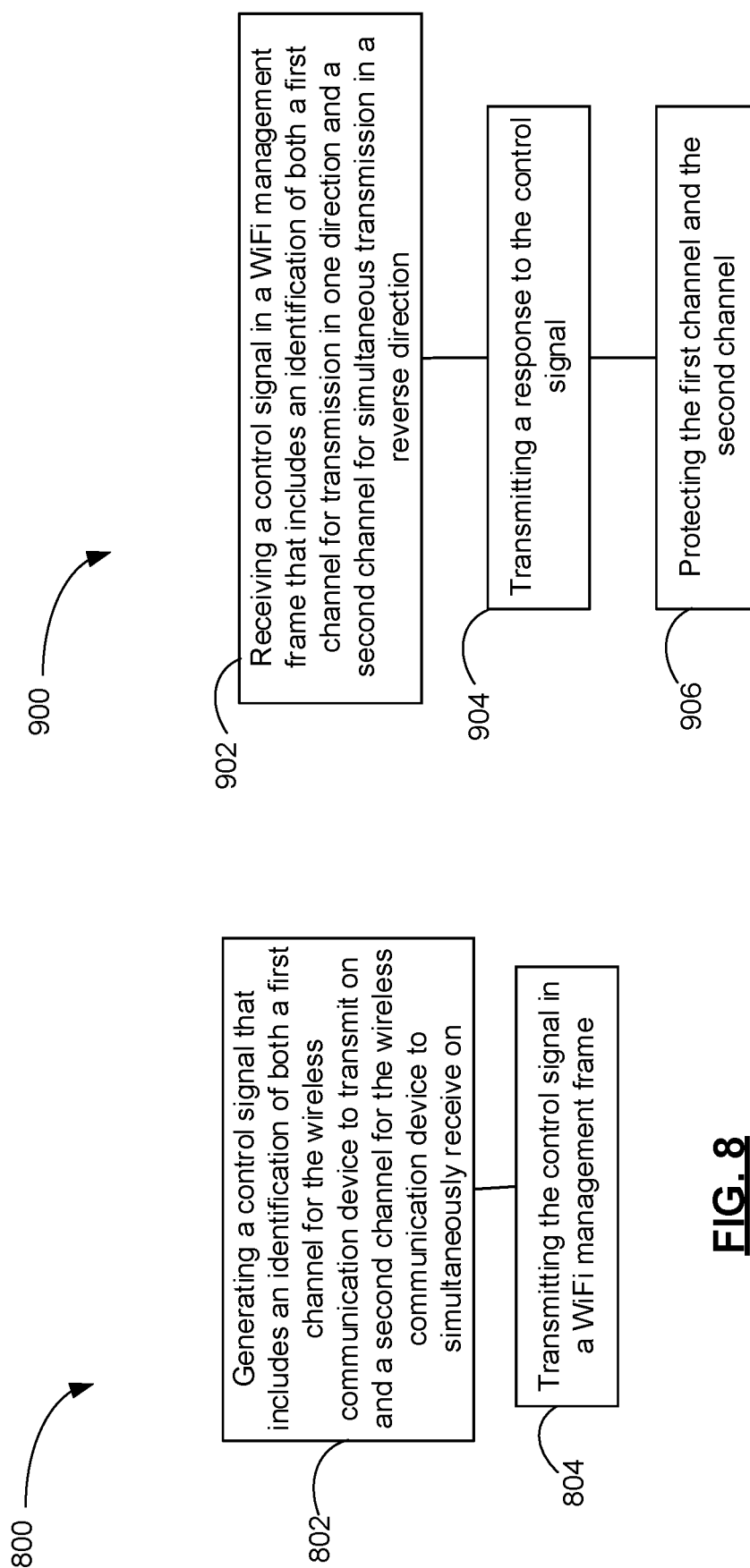

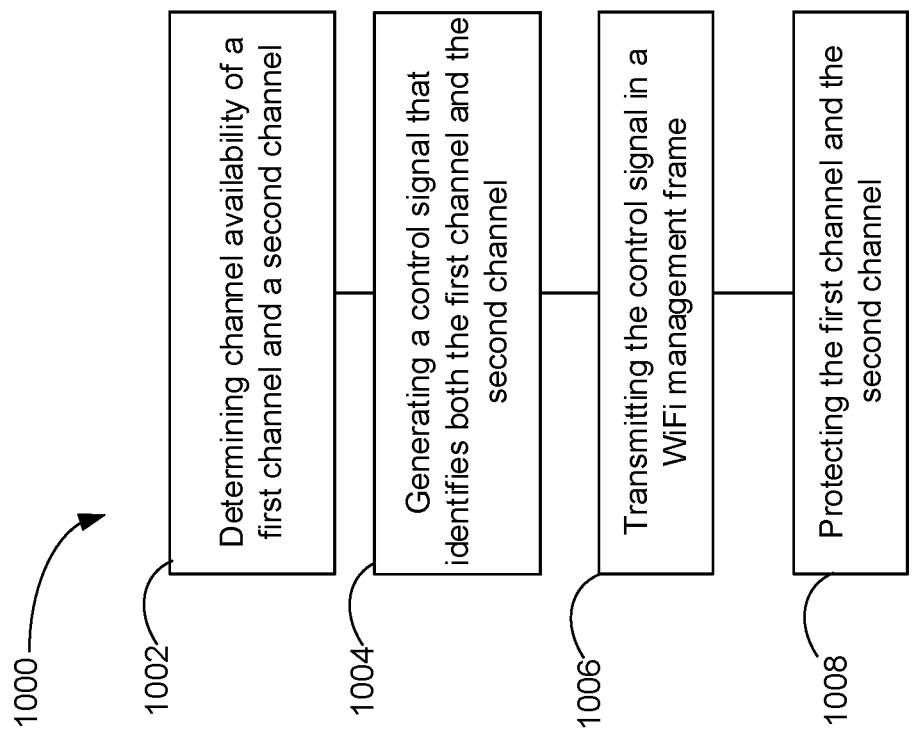

SYSTEMS AND METHODS FOR OUT-OF-BAND FULL DUPLEX COMMUNICATIONS

TECHNICAL FIELD

Example embodiments relate to wireless communications, in particular systems and methods for out-of-band full duplex communications.

BACKGROUND

The Institute of Electrical and Electronics Engineers (IEEE) sets standards for wireless communication technologies, including wireless local area network (WLAN) communication technologies. The IEEE 802.11 family of standards relate to WLANs and their quality of service (QoS), access point protocol, security enhancement, wireless management, etc.

Full Duplex (FD) communications refers to a wireless communication device transmitting and receiving communications at the same time. Half Duplex refers to transmitting and receiving being performed by a wireless communication device, in only one direction at a time. When two-way FD communications is performed over the same communication channel, there exists self-interference between the transmitted and the received signals at the same frequency, which is generally undesired and needs to be cancelled.

Accordingly, it would be desirable to provide a solution that emulates FD communications, and does not cause self-interference within a single communications channel.

SUMMARY

Example embodiments relate to emulating Full Duplex (FD) communications between two or more wireless communication devices by way of out-of-band Full Duplex, also known as Frequency Division Duplexing-Full Duplex (FDD-FD). In out-of-band FD communications, one communication channel is used for transmitting a first communication in one direction and a second (different) communication channel is used for simultaneously transmitting in the reverse direction. Example embodiments relate to management frames and control signals for managing channel availability and channel selection for the out-of-band FD communications between wireless communication devices. The out-of-band FD communications may reduce any self-interference when compared to FD communications that only use a single communications channel. An example management frame includes an identification of both the first channel for the wireless communication device to transmit on, and the second channel for the wireless communication device to simultaneously receive on.

An example embodiment is a method implemented by a wireless communication device capable of simultaneously transmitting and receiving wireless signals, the method includes: generating a control signal that includes an identification of a first channel for the wireless communication device to transmit on, and a second channel for the wireless communication device to simultaneously receive on; and transmitting the control signal in a WiFi management frame.

In an example embodiment of any of the above-described methods, the method further includes determining channel availability for the first channel and the second channel.

In an example embodiment of any of the above-described methods, the determining includes performing a Clear Channel Assessment (CCA) on the first channel and the second channel.

In an example embodiment of any of the above-described methods, the determining includes: generating a Request-To-Send (RTS) Frame and transmitting the RTS Frame over the first channel and the second channel; receiving a Clear to Send (CTS) Frame over the first channel and the second channel; and determining that the first channel and the second channel are available based on receiving the CTS Frame over the first channel and the second channel.

In an example embodiment of any of the above-described methods, the CTS Frame protects the first channel and the second channel.

In an example embodiment of any of the above-described methods, the determining includes: transmitting the control signal over the first channel; receiving a response to the control signal over the second channel; and determining that the first channel and the second channel are available based on receiving the response over the first channel and the second channel.

In an example embodiment of any of the above-described methods, one or both of the first channel and the second channel is a primary channel.

In an example embodiment of any of the above-described methods, the first channel and the second channel are each a primary channel in different bands.

In an example embodiment of any of the above-described methods, the method further includes: receiving a response to the control signal; and protecting, in response to the receiving, the first channel and the second channel.

In an example embodiment of any of the above-described methods, the method further includes: transmitting at least one first transmission over the first channel; and receiving at least one second transmission over the second channel, wherein the at least one second transmission has overlap in time with the at least one first transmission.

In an example embodiment of any of the above-described methods, the transmitting includes transmitting the at least one first transmission to a first station (STA), and the receiving includes receiving the at least one second transmission from a second STA.

In an example embodiment of any of the above-described methods, the method further includes, when a last transmission of the at least one first transmission ends after a last transmission of the at least one second transmission, transmitting an acknowledgment frame over the first channel in response to the at least one second transmission and after time unit Short InterFrame Space (SIFS) from the last transmission of the at least one transmission.

In an example embodiment of any of the above-described methods, the method further includes, when a last transmission of the at least one second transmission ends after a last transmission of the at least one first transmission, receiving an acknowledgement frame over the second channel in response to the at least one first transmission and after time unit Short InterFrame Space (SIFS) from the last transmission of the at least one second transmission.

In an example embodiment of any of the above-described methods, the transmitting of the control signal includes broadcasting the control signal or transmitting a beacon frame that includes the control signal.

In an example embodiment of any of the above-described methods, the wireless communication device is a Station (STA), an access point (AP), or a personal basic service set (PBSS) control point (PCP).

Another example embodiment is a method implemented by a wireless communication device, the method including: receiving a control signal in a WiFi management frame that includes an identification of both a first channel for transmission in one direction and a second channel for simultaneous transmission in a reverse direction; transmitting a response to the control signal; and protecting the first channel and the second channel.

In an example embodiment of any of the above-described methods, the receiving includes receiving the control signal from a second wireless communication device, wherein the protecting includes protecting the first channel and the second channel for communication between the wireless communication device and the second wireless communication device.

In an example embodiment of any of the above-described methods, the protecting excludes use of the first channel and the second channel by devices other than the wireless communication device and the second wireless communication device.

In an example embodiment of any of the above-described methods, the first channel and the second channel is protected for any wireless communication devices that responds to the control signal.

In an example embodiment of any of the above-described methods, the method further includes receiving a Request-To-Send (RTS) Frame over the first channel and the second channel, wherein the protecting includes transmitting a Clear to Send (CTS) Frame over the first channel and the second channel.

In an example embodiment of any of the above-described methods, the receiving includes receiving the control signal over the first channel and the second channel, and the transmitting includes transmitting the response over the first channel and the second channel.

In an example embodiment of any of the above-described methods, the method further includes: receiving at least one first transmission over the first channel; and transmitting at least one second transmission over the second channel, wherein the at least one second transmission has overlap in time with the at least one first transmission.

In an example embodiment of any of the above-described methods, the method further includes, when a last transmission of the at least one second transmission ends after a last transmission of the at least one first transmission, transmitting an acknowledgement frame over the second channel in response to the at least one first transmission and after time unit Short InterFrame Space (SIFS) from the last transmission of the at least one second transmission.

In an example embodiment of any of the above-described methods, the method further includes, when a last transmission of the at least one first transmission ends after a last transmission of the at least one second transmission, receiving an acknowledgement frame over the first channel in response to the at least one second transmission and after time unit Short InterFrame Space (SIFS) from the last transmission of the at least one first transmission.

An example embodiment is a wireless communication device, comprising an antenna; a processing device; a memory associated with the processing device for storing instructions that when executed by the processing device causes the processing device to perform any of the described methods, processes or functions.

An example embodiment is a non-transitory computer-readable medium which stores instructions that when executed by a processing device causes the processing device to perform any of the described methods, processes or functions.

BRIEF DESCRIPTION OF THE DRAWINGS

For a more complete understanding of the present example embodiments, and the advantages thereof, reference is now made to the following description taken in conjunction with the accompanying drawings, in which:

FIG. 1C is a schematic diagram of out-of-band Full Duplex (FD) communication between two wireless communication devices such as an Access Point (AP) and a Station (STA) of the wireless communication system, according to an example embodiment;

FIG. 1D is a schematic diagram of asymmetric out-of-band FD communication between an AP and two different STAs of the wireless communication system, according to an example embodiment;

FIG. 1E is an example timing diagram of the out-of-band FD communication of FIG. 1C between the AP and the STA;

FIG. 1F is an example timing diagram of the asymmetric out-of-band FD communication of FIG. 1D between the AP and the two different STAs;

FIG. 8 illustrates an example method implemented by a wireless communication device for managing out-of-band FD communication, in accordance with an example embodiment; and FIG. 9 illustrates an example method implemented by a wireless communication device for managing out-of-band FD communication, in accordance with an example embodiment.

FIG. 10 illustrates an example method implemented by a wireless communication device for protecting channels, in accordance with an example embodiment.

DETAILED DESCRIPTION OF EXAMPLE EMBODIMENTS

Example embodiments relate to management of out-of-band Full Duplex (FD) communications between wireless communication devices. Example embodiments relate to management frames and control signals for managing channel availability and channel selection for the out-of-band FD communications between the wireless communication devices.

Figure 1A:
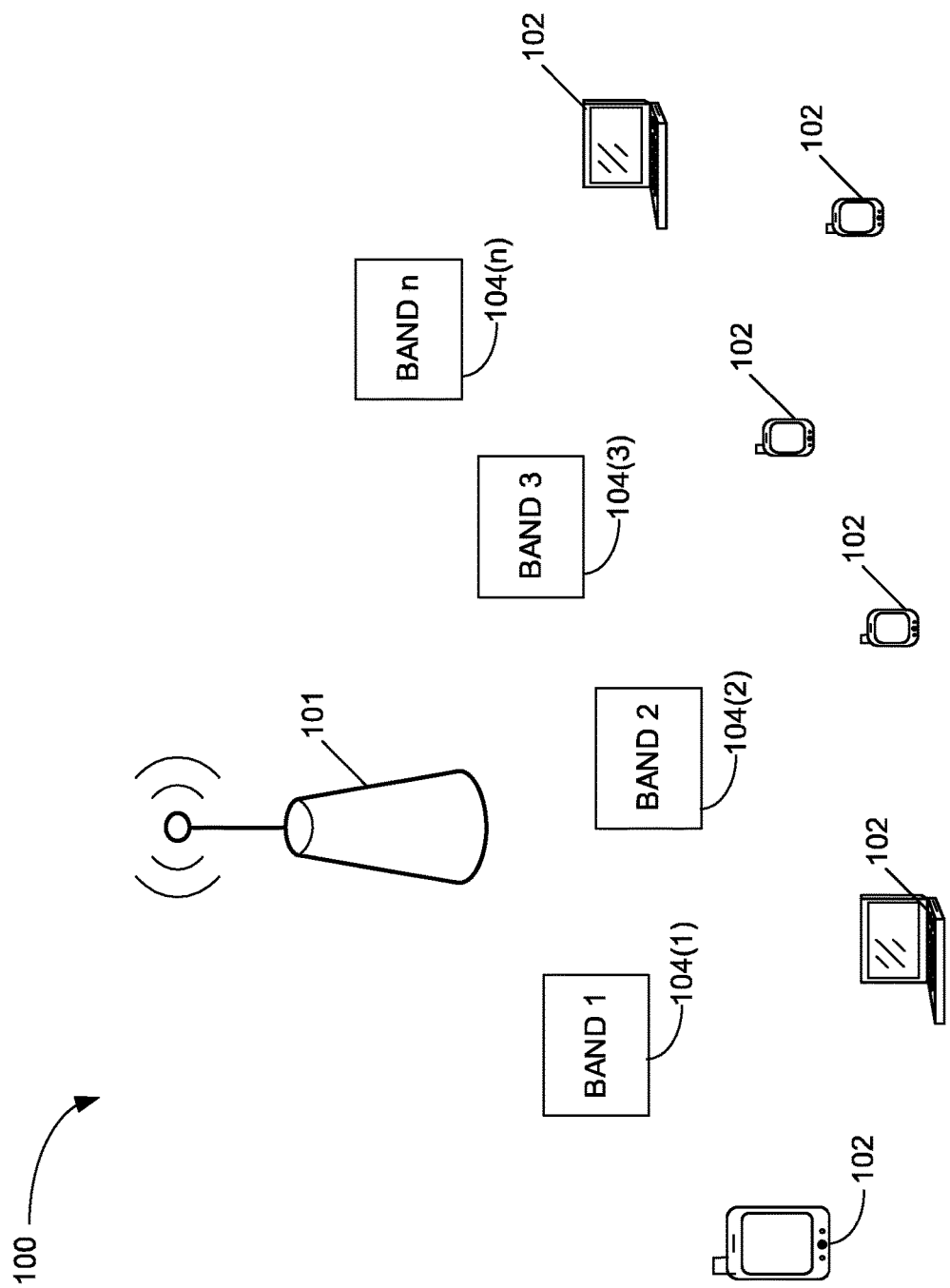
FIG. 1A is a schematic diagram illustrating a wireless communication system in which example embodiments may be implemented, according to an example embodiment.
Figure 2:
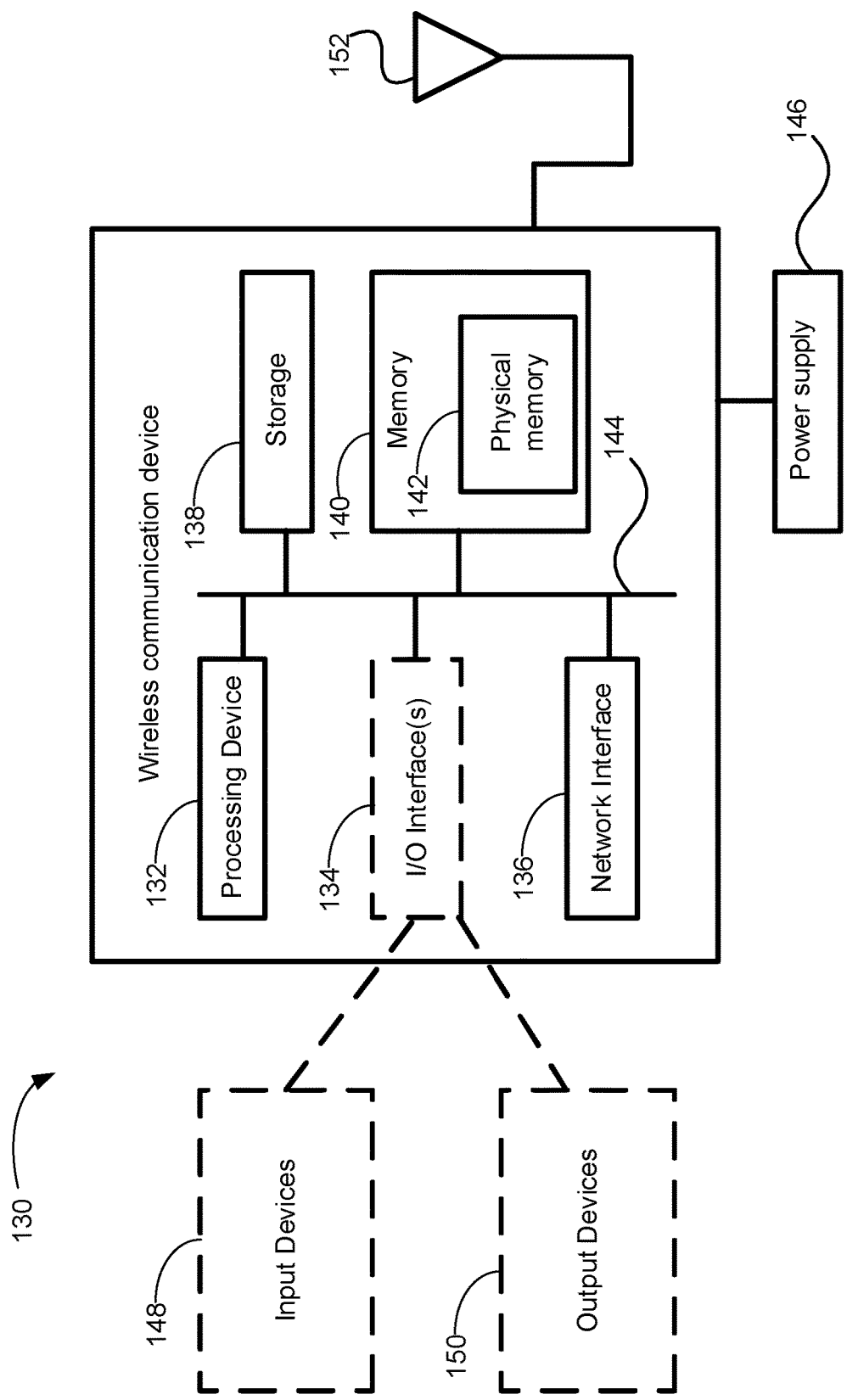
FIG. 2 is a schematic representation of an example wireless communication device according to an example embodiment.

FIG. 1A illustrates an example schematic diagram of a wireless communication system 100 in which example embodiments may be implemented. The wireless communication system 100 includes an access point 101 (AP, also known as an AP STA, a personal basic service set (PBSS) control point (PCP), or a network coordinator), and at least one station 102 (STA, also known as non-AP STA) in a wireless communication network, such as a wireless local area network (WLAN). The AP 101 is any entity that has STA functionality and provides access to the Internet or a distribution service for the associated STAs 102. The AP 101 can be any component (or collection of components) configured to provide wireless access in a network, and can be an evolved NodeB (eNB), a macro-cell, a femtocell, distribution node, a WiFi AP, or other wirelessly enabled devices. The AP 101 may, for example, provide wireless access in accordance with one or more wireless communication protocols, e.g., Long Term Evolution (LTE), LTE advanced (LTE-A), High Speed Frame Access (HSPA), WiFi 802.11a/b/g/n/ac/ad/ax/ay, and other 802.11 protocols or future 802.11 protocols. The STAs 102 may be mobile communication devices enabled for wireless communications, including but not limited to User Equipment (UE), mobile phones, smart phones, laptops, tablet computers, machine-type communication devices, Internet of Things (IoT) devices, and wireless sensing and reporting devices. The AP 101 and the STAs 102 can each be configured to execute uplink (UL) transmission and downlink (DL) transmissions in the WLAN. An example detailed embodiment of the AP 101 and the STA 102 is a wireless communication device 130 as illustrated in FIG. 2.

In the WLAN of FIG. 1A, the AP 101 may provide access to the Internet or a distribution service for one or more STAs 102 that are wirelessly and communicatively associated with the AP 101. The AP 101 can access the Internet or the distribution service by way of wired or wireless communication. Although only one single AP 101 is shown, this is only illustrative and is not intended to be limiting. In other examples, there may be more than one AP 101 within the wireless communication system 100.

The AP 101 and the STAs 102 can communicate over one or more wireless bands, shown as Band 1 (104(1)), Band 2 (104(2)), Band 3 (104(3)), . . . , and Band n (104(n)) (generically referred to as band 104). In some examples, each band 104 can be defined by a particular IEEE 802.11 standard, future IEEE 802.11 standards, unlicensed standards or bands, or one or more specified bands as agreed between the devices. In an example embodiment, Band 1 (104(1)) is the 2.4 GHz band, Band 2 (104(2)) is the 5 GHz band, and Band 3 (104(3)) is the 6 GHz band. Another example band is 60 GHz for IEEE 802.11ay enhanced directional multi-gigabit (EDMG).

In some example embodiments, each band 104 includes a plurality of channels, and each channel can include a plurality of sub-channels. Each channel has a channel bandwidth, for example the channels in Band 1 (104(1)) of 2.4 GHz band can have a defined bandwidth of 20 MHz or 40 MHz. For example, the channels in Band 2 (104(2)) of 5 GHz band or Band 3 (104(3)) of 6 GHz band can each have a defined bandwidth of 40 MHz, 80 MHz, or 160 MHz. In another example, for IEEE 802.11ay EDMG, the band 104 is 60 GHz and the defined channel bandwidth is 2.16 GHz. Some example embodiments have fixed defined bandwidths for each channel. Some example embodiments have variably-sized bandwidths for each channel, for example based on network requirements.

In some IEEE 802.11 standards, one of the channels in the respective band 104 is defined as the primary channel. The primary channel can be a designated channel used by the STAs 102 for listening of commands and control signals from the AP 101. The primary channel may also be used as a default communication channel in some instances. The primary channel may be within one of the bands 104. In some examples, subsequent command, control and payload can be transmitted on the primary channel of the respective band 104, or other channels within the respective band 104. In an example embodiment, there is more than one primary channel, one for each band. In an example embodiment, for out-of-band FD communication, the primary channel can be reserved or protected for one of UL or DL transmission, but not both, and a second channel (different from the primary) can be reserved or protected for the other of UL or DL transmission. In an example embodiment, the first channel and the second channel can be reserved or protected for use only by the AP 101 and one STA 102, excluding use of the first channel and the second channel from all other devices.

Figure 1B:
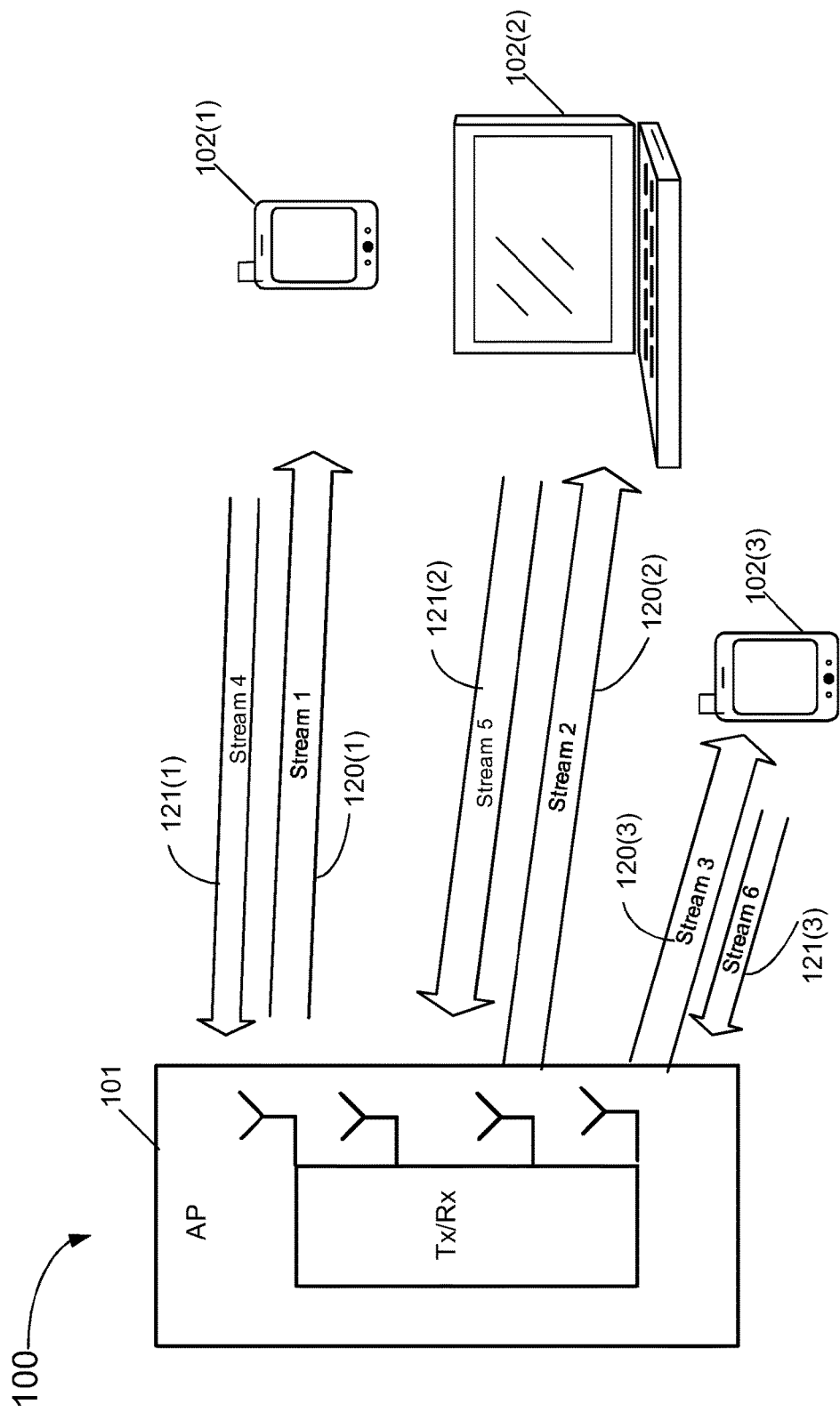
FIG. 1B is a schematic diagram of uplink (UL) and downlink (DL) transmissions of the wireless communication system, according to an example embodiment.

Referring to FIG. 1B, examples of the WLAN will be described in the context of wireless communications between an AP 101 and a plurality of STAs, including first STA 102(1), second STA 102(2), and third STA 102(3). In some example embodiments, the wireless communication system 100 supports multi-user multiple input multiple output (MU-MIMO) transmissions. The AP 101 and at least one of the STAs 102 may be configured for single user (SU) communications in other examples. MU-MIMO based transmission, which can use multiple antennas with beam steering, allows simultaneous channel access by the STAs 102 for effective use of channels in the WLAN. The AP 101 can simultaneously transmit spatial-multiplexed data to the STAs 102. Payload data can be simultaneously transmitted by the AP 101 to the STAs 102 using a plurality of respective streams (stream 1, 2, 3 shown in FIG. 1B) in the DL direction, shown as DL transmissions 120(1) to 120(3) (generically referred to as DL transmission 120). In the DL direction, payload data transmitted to each STA 102 may be different for each STA 102. In the UL direction, payload data can be simultaneously transmitted to the AP 101 using a plurality of respective streams (stream 4, 5, 6 shown in FIG. 1B), shown as UL transmissions 121(1) to 121(3) (generically referred to as UL transmission 121). The DL transmissions 120 and the UL transmissions 121 are payload data transmissions. The DL transmissions 120 and the UL transmissions 121 may use Orthogonal Frequency Division Multiple Access (OFDMA), with MU-MIMO or without MU-MIMO.

In some examples, the streams of the DL transmissions 120 and the UL transmissions 121 are spatial streams that are directionally transmitted in space.

In some example embodiments, at least some of the streams of the DL transmissions 120 are DL Multi-User (MU) transmissions, and at least some of the streams of the UL transmissions 121 are UL MU transmissions. In some example embodiments, at least some of the streams of the DL transmissions 120 are DL Single User (SU) transmissions, and at least some of the streams of the UL transmissions 121 are UL SU transmissions. In some example embodiments, the DL transmissions 120 and the UL transmissions 121 represent transmissions that are used to transmit non-payload information such as control frames, management frames (including WiFi management frames), control signals, broadcast frames, beacon frames, etc.

In some example embodiments, the AP 101 is configured to emulate FD communications, by way of out-of-band FD communications, so as to transmit and receive communications at the same time over two (or more) different communications channels. Example types of information transmitted in the out-of-band FD communications include Physical Layer Convergence Procedure (PLCP) Protocol Data Unit (PPDU) frames with payload data, Media Access Control (MAC) protocol data units (MPDU), aggregate MPDU (A-MPDU), management frames, trigger frames, broadcast frames, beacon frames, acknowledgement frames (ACK frames or BlockACK frames), control signals and other data. In some examples, at least one STA 102 can emulate FD communications by way of out-of-band FD communications and can transmit and receive communications at the same time over two (or more) different communications channels. In some examples, at least one STA 102 is only capable of Half Duplex wireless communication and can both transmit and receive communications, but not simultaneously.

In FIG. 1B, in some example embodiments, for out-of-band FD communication, at least one stream of the DL transmissions 120 is transmitted simultaneously with at least one stream of the UL transmissions 121. Such DL transmissions 120 are transmitted over one or more channels, and such UL transmissions 121 are transmitted over one or more different channels than those of the DL transmissions 120, thereby implementing out-of-band FD communication.

FIG. 1C is a schematic diagram of out-of-band FD communication between the AP 101 and the first STA 102(1), according to an example embodiment. In the example of FIG. 1C, the AP 101 and the first STA 102(1) can both be capable of out-of-band FD communication. In FIG. 1C, The AP 101 transmits a DL transmission 120(1) to the first STA 102(1), and the first STA 102(1) simultaneously transmits an UL transmission 121(1) to the AP 101. The DL transmission 120(1) is transmitted over a first (e.g. primary) channel, and the UL transmission 121(1) is transmitted over a second channel, different from the primary channel. In an alternate example embodiment (not shown here), the UL transmission 121(1) is transmitted over the primary channel, and the DL transmission 120(1) is transmitted over a different channel.

FIG. 1D is a schematic diagram of asymmetric out-of-band FD communication between the AP 101, the first STA 102(1), and the second STA 102(2), according to an example embodiment. In the example of FIG. 1D, the AP 101 can be capable of out-of-band FD communication. Each of the STAs first 102(1) and the second STA 102(2) can be capable of either out-of-band FD communication or only Half Duplex communication. In FIG. 1D, The AP 101 transmits a DL transmission 120(2) to the second STA 102(2), and the first STA 102(1) simultaneously transmits an UL transmission 121(1) to the AP 101. The DL transmission 120(2) is transmitted over a first (e.g. primary) channel, and the UL transmission 121(1) is transmitted over a second channel that is different than the first channel. In an alternate example embodiment (not shown here), the UL transmission 121(1) is transmitted over the primary channel, and the DL transmission 120(1) is transmitted over the second channel.

FIG. 1E is an example timing diagram of the out-of-band FD communication of FIG. 1C between the AP 101 and the first STA 102(1). In FIG. 1E, the DL transmission 120(1) and the UL transmission 121(1) between the AP 101 and the first STA 102(1) overlap in time for an overlap time period of $T_o$. The DL transmission 120(1) and the UL transmission 121(1) occur at the same time.

FIG. 1F is an example timing diagram of the asymmetric out-of-band FD communication of FIG. 1D between the AP 101, the first STA 102(1) and the second STA 102(2). During the asymmetric out-of-band FD communication, the AP 101 sends the DL transmission 120(1) to the first STA 102(1) over the first (primary) communication channel, and receives the UL transmission 102(2) from the second STA 102(2) over a second communication channel. In example embodiments the DL transmission 120(1) and the UL transmission 121(2) overlap for an overlap time period of $T_o$. As shown in FIG. 1F, in some examples there is a time difference $T_d$ that precedes the transmission of the UL transmission 102(2) from the second STA 102(2). In other example embodiments, there is no time difference $T_d$ and the DL transmission 120(1) and the UL transmission 102(2) overlap in time.

In some examples, yet further STAs 102 can communicate asymmetric out-of-band FD communication with the AP 101, having any combination of overlapping time periods, in one direction, using different channels or with the same respective channels that are used for the DL transmission 120(1) and the UL transmission 121(2). Any two transmissions over different channels that have any overlapping time period can be said to be communicated at the same time, or simultaneously, for the purposes of out-of-band FD communication.

Figure 3:
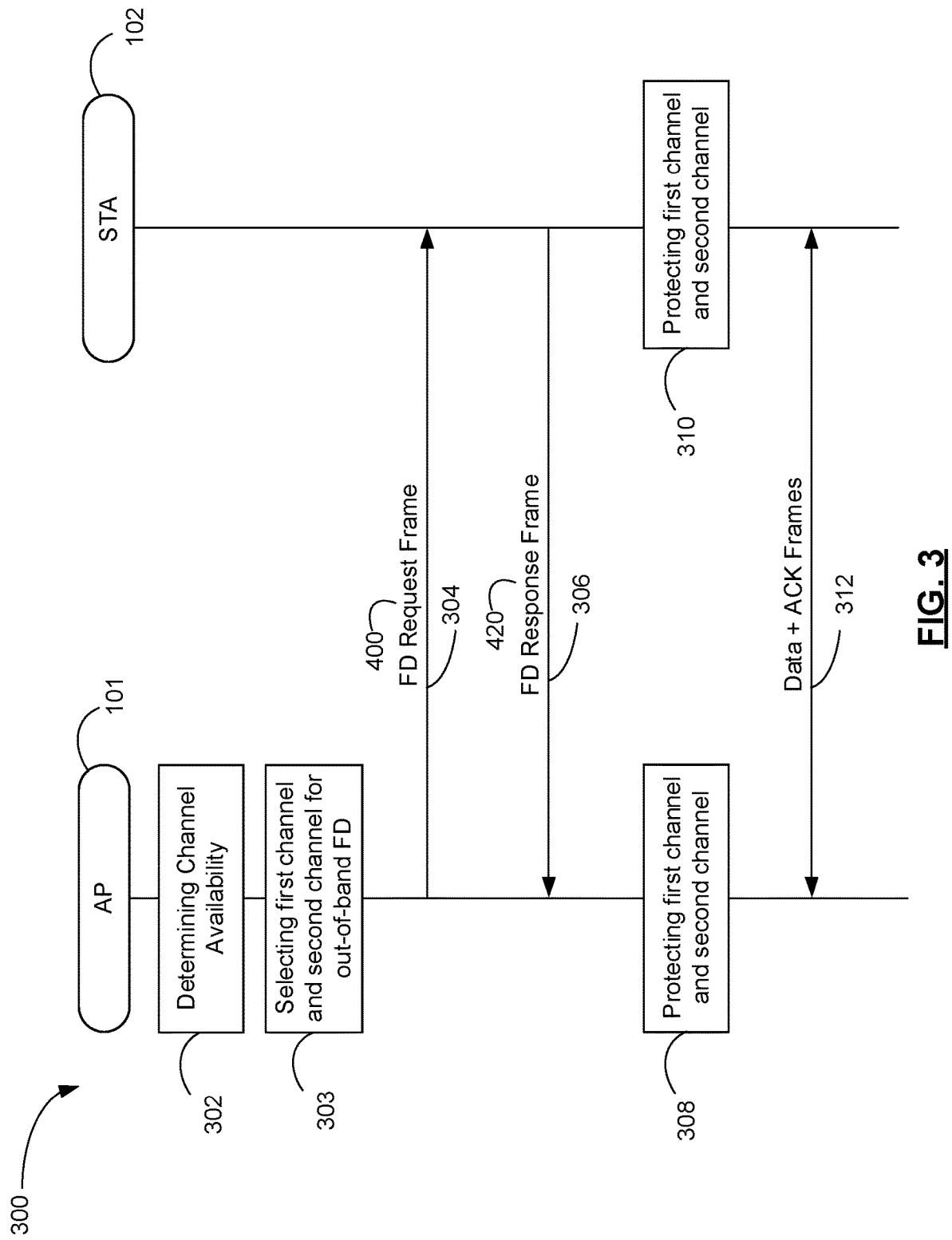
FIG. 3 is an example method in the form of a messaging diagram between the AP and a STA for managing out-of-band FD communication, according to an example embodiment.

FIG. 3 is an example method 300 in the form of a messaging diagram between two wireless communication devices 130, e.g. the AP 101 and a STA 102, for managing out-of-band FD communication. At step 302, the AP 101 determines which channels are available. The AP 101 can determine availability of specific channels, or determine availability of all channels, or determine availability until a specific number of channels are available (e.g. two channels). At step 303, the AP 101 selects, from the available channels determined at step 302, a first channel and a second channel as candidate channels for out-of-band FD communication. At step 304, the AP 101 transmits to the STA 102 a management frame that contains a request for out-of-band FD communication, denoted FD Request Frame 400. The FD Request Frame 400 includes an identification of the first channel and the second channel. In an example, the first channel is designated for DL transmission for the out-of-band FD communication, and the second channel can be designated for UL transmission for the out-of-band FD communication. At step 306, the STA 102 transmits to the AP 101 (and the AP 101 receives) a management frame that responds to the FD Request Frame 400, denoted FD Response Frame 420. The FD Response Frame 420 can positively respond to (affirm) the FD Request Frame 400, or can negatively respond (reject) the FD Request Frame 400. If no FD Response Frame 420 is received after a certain time period or frame interval, in some examples the AP 101 does not proceed with out-of-band FD communication. In an example, the AP 101 transmits the FD Request Frame 400 over both the first channel and the second channel, and if no response is received over both the first channel and the second channel, the AP 101 does not proceed with out-ofband FD because the channels were not able to successfully carry the FD Request Frame 400 or the FD Response Frame 420, or simply because the receiving STA 102 had ignored the request or was unable to handle the request. At step 306, successful receipt of the FD Response Frame 420 over both the first channel and the second channel also means that the first channel and the second channel are available for out-of-band FD communications.

At step 308, in response to receiving a positive response in the FD Response Frame 420, the AP 101 protects the first channel and the second channel for purposes of out-of-band FD communication. At step 310, the STA 102 also protects the first channel and the second channel for purposes of out-of-band FD communication. For steps 308 and 310, for example, the first channel is protected for DL transmission, and the second channel is protected for UL transmission.

In some examples of step 308 and step 310, the first channel and the second channel are protected by the AP 101 and the STA 102 for a protection period, e.g. specified number or amount of time, chips/slots, or time-to-live (TTL), or number of communications, etc. The protection period can be transmitted from the AP 101 to the STA 102 in some examples, and can be predetermined in other examples. In some examples, when the protection time expires or just before the protection time expires, the method 300 can be performed again to set up the out-of-band FD communication to provide continuity for the out-of-band FD communication.

At step 312, out-of-band FD communication is performed between the AP 101 and the STA 102, which can include further management frames, PPDU frames (which include payload data), MPDUs, and acknowledgement frames (ACK or BlockACK). The out-of-band FD communication at step 312 includes DL transmissions and UL transmissions that have overlap in time over the respective first channel and second channel. In an example, the first channel is protected for DL transmission from the AP 101 to the STA 102, and any ACK or BlockACK frames or other confirmation messages from the STA 102 are transmitted over the second channel. Similarly, continuing the example, the second channel is protected for UL transmission from the STA 102 to the AP 101, and any ACK frames, BlockACK frames or other confirmation messages from the AP 101 are transmitted over the first channel.

In some examples, the method 300 is performed between the AP 101 and one STA 102. In some examples, the first channel and the second channel is protected only as between the AP 101 and the one STA 102 for the out-of-band FD communication, without being usable by other STAs 102. In such examples, the AP 101 and the one STA 102 can exclusively perform two-way out-of-band FD communication in the manner of FIG. 1C.

In other examples, the method 300 is performed between the AP 101 and a plurality of the STAs 102. Each of the STAs 102 can confirm whether they are protecting (via step 310) both the first channel and the second channel in the out-of-band FD communication. The AP 101 and the STAs 102 can perform asymmetric out-of-band FD communication as in FIG. 1D in such examples. The AP 101 and the STAs 102 can also perform two-device out-of-band FD communication in the manner of FIG. 1C in such examples. In other examples, the AP 101 and the plurality STAs 102 can perform OFDMA MU communications over out-of-band FD communication, for example with MU DL transmissions over the first channel and MU UL transmissions over the second channel. In some examples, a trigger frame is transmitted by the AP 101 to the STAs 102 over the first channel and the responsive OFDMA MU UL transmissions are received by the AP 101 from the STAs 102 over the second channel. As well, in some examples an acknowledgement frame (ACK or BlockACK) can be transmitted on the first channel or the second channel to acknowledge a transmission from the other of the first channel or the second channel.

In some examples, the method 300 is repeated by the AP 101 with each of the STAs using direct transmissions. In other examples, at step 304 the AP 101 transmits the FD Request Frame 400 in a broadcast or a beacon frame. Any of the STAs 102 can respond to the broadcast or the beacon frame to the AP 101 by way of the FD Response Frame 420 at step 306.

In an alternate example, the steps of the method 300 performed by the AP 101 are instead performed by another wireless communication device, such as a STA 102. In such a scenario, the STA 102 is the device that is initiating or requesting the out-of-band FD communication by transmitting the FD Request Frame 400. In an example, the responding device that responds to the initiating STA 102 with the FD Response Frame 420 can be another STA 102, thereby implementing peer-to-peer out-of-band FD communication. In another example, the responding device that responds to the initiating STA 102 with the FD Response Frame 420 can be the AP 101, in which case the AP 101 performs step 306 and step 310.

Figure 4:
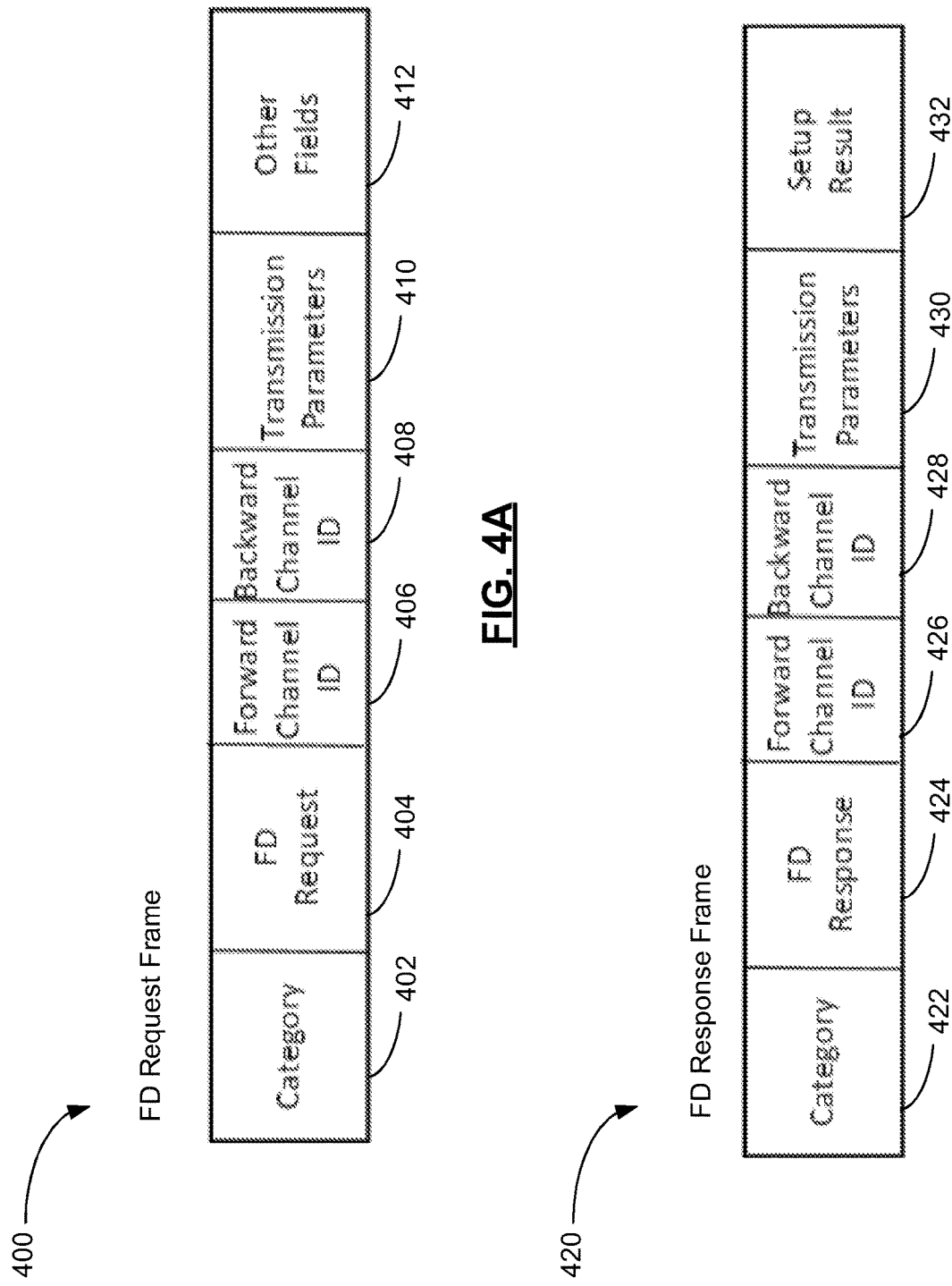
FIG. 4A is an example management frame for requesting FD communication, according to an example embodiment.
FIG. 4B is an example management frame for responding to the request for FD communication of FIG. 4A, according to an example embodiment.

FIG. 4A is an example of the FD Request Frame 400, according to an example embodiment. FIG. 4B is an example of the FD Response Frame 420, according to an example embodiment. In some example embodiments, the FD Request Frame 400 and the FD Response Frame are in the format of an action frame. An action frame is a type of management frame. The FD Request Frame 400 includes Category Field 402, FD Request Field 404, Forward Channel ID Field 406, Backward Channel ID Field 408, Transmission Parameters Field 410, and Other Fields 412. The FD Response Frame 420 includes Category Field 422, FD Response Field 424, Forward Channel ID Field 426, Backward Channel ID Field 428, Transmission Parameters Field 430, and Setup Result 432. The FD Request Frame 400 and the FD Response Frame 420 are action frames, and the FD Request Field 404 and the FD Response Field 424 are the action codes for their respective action frames, for indicating the out-of-band FD request and out-of-band FD response, respectively.

The Forward Channel ID Field 406, 426 and the Backward Channel ID Field 408, 428 indicate the first channel and the second channel for the out-of-band FD communication. In an example, the Forward Channel ID Field 406, 426 indicates the first channel for DL transmission, and the Backward Channel ID Field 408, 428 indicates the second channel for UL transmission. In an example, the first channel indicated by the Forward Channel ID Field 406, 426 is the primary channel for the particular band as defined by an IEEE standard or other definition. In an example, the second channel in the Backward Channel ID Field 408, 428 is a second primary channel in the same band 104 as the primary channel, for IEEE standards or wireless communication systems that define two primary channels for a particular band 104.

The Transmission Parameters Field 410 includes respective transmission parameters for the out-of-band FD communication. Example transmission parameters include Modulation and Coding Scheme (MCS), Space-Time Block Coding (STBC), Number of MU-MIMO Spatial Streams (NSS), bandwidth (BW), etc. In some examples, the Other Fields 412 includes other subfields relating to the out-of-band FD communication, for example the duration of the protection period of the first channel and the second channel. The Other Fields 412 can also be reserved for future or alternative subfields.

In the FD Response Frame 420, the Setup Result Field 432 indicates the response to the FD Request Frame 400, which can be a positive response (affirmation) or a negative response (rejection) of the requested out-of-band FD communication for the first channel indicated in the Forward Channel ID Field 406 and the second channel indicated in the Backward Channel ID Field 408.

In some examples, the Category Field 402, 422 in each respective Frame 400, 420 occupies one octet, and the size of the remaining fields of the Frames 400, 420 is variable. In other examples the size of the remaining fields of the Frames 400, 420 is fixed. More or fewer fields may be contained in the FD Request Frame 400 and the FD Response Frame 400 in some example embodiments.

In example embodiments, the control signals described in the fields of the FD Request Frame 400 and the FD Response Frame 400 can be contained in control frames, management frames (including WiFi management frames), action frames, broadcast frames, beacon frames, preambles, trigger frames, or other suitable transmission types.

Detailed examples of step 302 (FIG. 3), in which the AP 101 determines channel availability for the out-of-band FD communication, will now be described in greater detail. In some example, the availability of each primary channel of each band 104 is simultaneously checked. In some examples, a primary and a secondary channel are simultaneously checked for availability. In some examples, once a first channel (e.g. for DL transmission) and a second channel (e.g. for UL transmission) are determined to be available, the AP 101 does not check any other channels and proceeds with next steps of the method 300.

In an example of step 302, the AP 101 performs a Clear Channel Assessment (CCA) to detect energy levels at select channels, as understood in the art. When the energy level is below a CCA threshold, then the channel is available (idle). For example, the AP 101 first senses the energy level of the primary channel(s) via the CCA, and then sense the secondary channel(s) before a backoff counter counts down to zero. The AP 101 can transmit on the particular channels that are available (idle). The AP 101 can transmit on the secondary channel(s) after the time unit PCF InterFrame Spacing (PIFS).

In some example embodiments, channel availability for out-of-band FD communication can be further determined by sending a request over one or more desired channels, and receiving a response over the same desired channels. For example, the request/response can be a Request-To-Send (RTS) Frame/Clear to Send (CTS) Frame, illustrated in greater detail in the method 500 FIG. 5. For example, the request/response can be the Request Frame 400/FD Response Frame 420 over the desired channels, illustrated in greater detail in the method 500 of FIG. 5 and the method 600 of FIG. 6.

In some example embodiments, a particular channel can be determined as being available for the out-of-band FD communication as a default, unless the CCA or other specified criteria is determined by the AP 101 so as to conclude that the channel is non-available. In an example embodiment, a channel can be determined to be non-available when the AP 101 knows that channel is occupied by one STA 102, or by a specified maximum number of STAs 102 (either currently or in just-past transmissions). In an example embodiment, a channel can be determined to be non-available in order to maintain a relatively equal distribution of STAs 102 in each channel, for load balancing, etc. In an example embodiment, a channel can be determined to be non-available when one STA 102 takes control of an available channel. Such a STA 102 may be reserving the channel for management, data content traffic, a different out-of-band FD communication with a different AP 101, or for other purposes. In an example embodiment, a channel is non-available when the AP 101 is performing testing, calibrating, etc. In an alternate example embodiment, a particular channel can be determined as being non-available as a default, unless specified criteria is determined by the AP 101 so as to conclude the channel as available.

Additional details of step 302 and step 303 are now described in greater detail. In some examples of step 302, the respective primary channel of each band 104 are each checked first (using CCA or other methods) to determine availability. Any available primary channels can be selected at step 303 as a potential first channel of the out-of-band FD communication. If there are two primary channels available, then a first primary channel of one band 104 is selected as the potential first channel, and a second primary channel of a different band 104 is selected as the potential second channel for the out-of-band FD. The use of different primary channels in different bands may reduce inter-channel interference or adjacent channel interference (ACI) for the simultaneous two-way communications over the first primary channel and the second primary channel for the out-of-band FD communication.

In some examples, when only one primary channel of one band 104 is available, further channels are then checked for availability in order of sequence within that one band 104. In other examples, further channels are checked for availability in random order within the band 104 having the available primary channel. In some examples, further channels from any of the bands 104 outside of that one band 104 are checked for availability.

In some example implementations where a particular band 104 has two primary channels, the first potential channel for the out-of-band FD communication is the first primary channel in the particular band 104, and the second channel for the out-of-band FD communication is the second primary channel in the same particular band 104.

Figure 5:
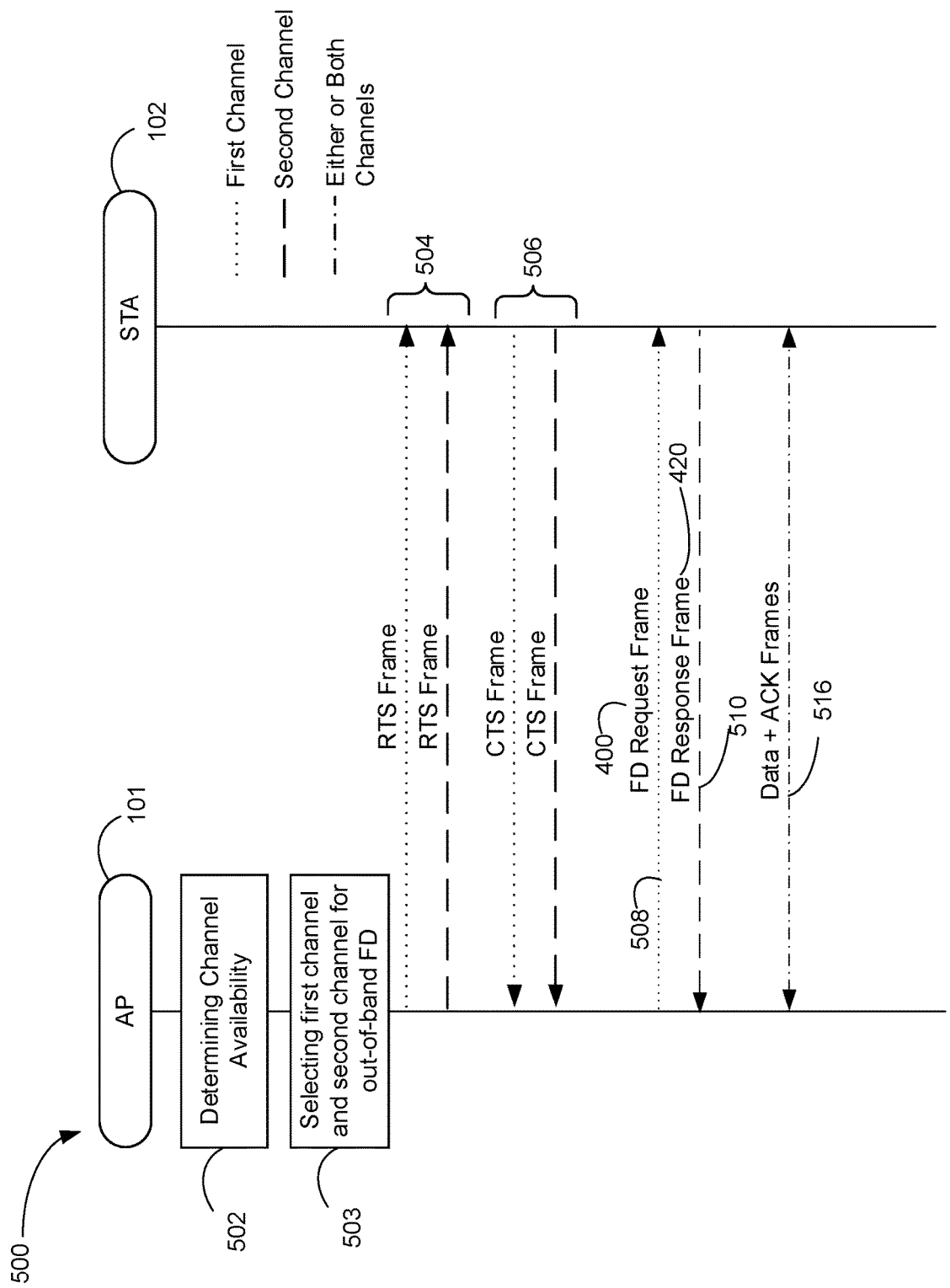
FIG. 5 is an example detailed implementation of the messaging diagram of FIG. 3 between the AP and the STA, according to an example embodiment.

FIG. 5 illustrates an example method 500 which is an example detailed implementation of the method 300 of FIG. 3 between the AP 101 and the STA 102, for managing out-of-band FD communication. At step 502, the AP 101 determines which channels are available (e.g. as in step 302, FIG. 3). At step 503, the AP 101 selects, from the available channels determined at step 502, a first channel and a second channel as candidate channels for out-of-band FD communication (e.g. as in step 303, FIG. 3).

The AP 101 then transmits communications over the first and the second channels to protect those channels and set up the out-of-band FD communication. At step 504, the AP 101 generates a Request-To-Send (RTS) Frame and transmits, to the STA 102, the RTS frame over both the first channel and the second channel. At step 506, the STA 102, in response to receiving the RTS frame, generates a Clear to Send (CTS) Frame and transmits the CTS Frame back over the same channels which had contained the RTS Frame. In one example, if the STA 102 only receives the RTS on one channel, the STA 102 in response transmits to the AP 101 the CTS Frame back over the one channel. If the STA 102 receives the RTS over both the first channel and second channel, the STA 102 transmits to the AP 101 the CTS Frame back over both the first channel and second channel. At step 506, if the AP 101 only receives one CTS Frame over one channel, the setup for out-of-band FD communication is considered to have failed and the method 500 ends. At step 506, if the AP 101 receives no CTS frame or receives no response after a specified time period, the setup for out-of-band FD communication is considered to have failed and the method 500 ends. The CTS frame at step 506 protects the first channel and the second channel for purposes of out-of-band FD communication exclusively between the AP 101 and the STA 102 (e.g. as in steps 308, 310, FIG. 3). Other STAs 102 and wireless communication devices can determine from monitoring the RTS/CTS Frames that the AP 101 and the STA 102 intend to use the specified channels for a specified duration, and exclude use of the specified channels by the other STAs 102 and wireless communication devices.

The above description, in some examples, can use a bandwidth of 20 MHz for the forward and the backward channels. The method 500 is also applicable to the case where the bandwidth is greater than 20 MHz, e.g. 40 MHz, 80 MHz, or 160 MHz, for example using channel bonding or carrier aggregation. In an example, when the bandwidth is greater than 20 MHz, the RTS and CTS frames are transmitted on each component channel.

When the AP 101 receives the CTS Frame back over both the first channel and second channel, the AP 101 then initiates setup of the out-of-band FD communication. In an example, at step 508 the AP 101 generates the FD Request Frame 400 to the STA 102 and transmits over the first channel (identified in the Forward Channel ID Field 406). At step 510, in response, the STA 102 can positively respond to the FD Request Frame 400 (affirm) by generating the FD Response Frame 420 and transmitting to the AP 101 over the second channel (previously identified in the Backward Channel ID Field 408). In another example, not shown, here, the STA 102 can positively respond to the FD Request Frame 400 (affirm) by generating the FD Response Frame 420 and transmitting to the AP 101 over both the first channel and the second channel.

At step 516, out-of-band FD communication is performed between the AP 101 and the STA 102 (e.g. as in step 312, FIG. 3).

Figure 6:
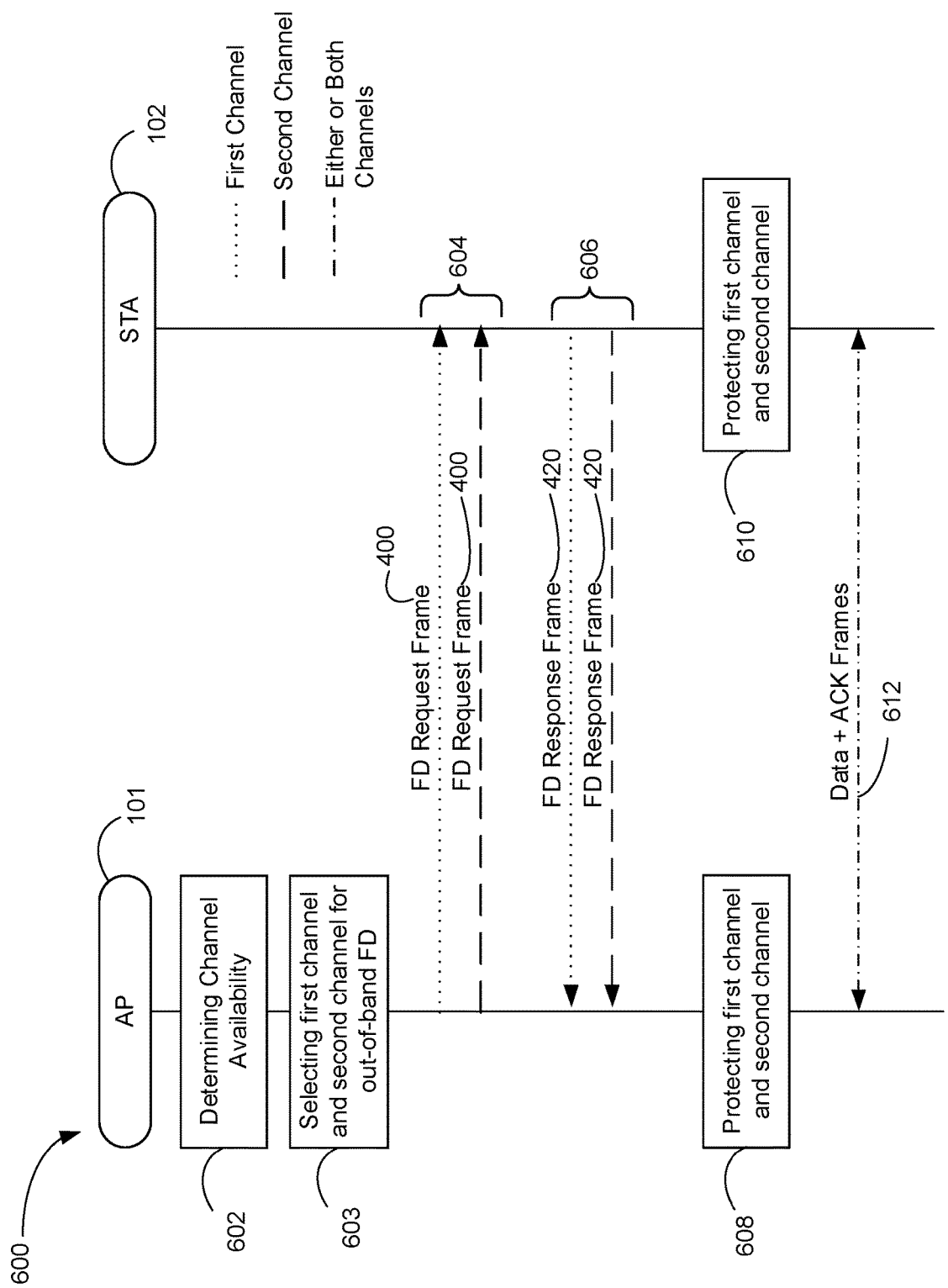
FIG. 6 is another example detailed implementation of the messaging diagram of FIG. 3 between the AP and the STA, according to an example embodiment.

FIG. 6 is another example method 600 which is an example detailed implementation of the method 300 of FIG. 3 between the AP 101 and the STA 102, for managing out-of-band FD communication. At step 602, the AP 101 determines which channels are available (e.g. as in step 302, FIG. 3). At step 603, the AP 101 selects, from the available channels determined at step 602, a first channel and a second channel as candidate channels for out-of-band FD communication (e.g. as in step 303, FIG. 3).

The AP 101 then transmits communications over the first and the second channels to set up the out-of-band FD communication. At step 604, the AP 101 generates the FD Request Frame 400 and transmits to the STA 102 over the first channel (identified in the Forward Channel ID Field 406) and the second channel (identified in the Backward Channel ID Field 408). At step 606, in response, the STA 102 can positively respond to the FD Request Frame 400 (affirm) by generating the FD Response Frame 420 and transmitting to the AP 101 over the first channel (previously identified in the Forward Channel ID Field 406) and the second channel (previously identified in the Backward Channel ID Field 408). A successful receipt of the FD Response Frame 420 over both the second channel and the second channel also means that the first channel and the second channel are available. At step 606, if the AP 101 only receives one FD Response Frame 420 over one channel, the setup for out-of-band FD is considered to have failed and the method 600 ends. At step 606, if the AP 101 receives no FD Response Frame 420 or receives no response after a specified time period, the setup for out-of-band FD communication is considered to have failed and the method 600 ends.

At steps 608 and 610, having cleared the first channel and the second channel, the AP 101 and the STA 102 protect the first channel and the second channel for purposes of out-of-band FD communication (e.g. as in steps 308, 310, FIG. 3). At step 612, out-of-band FD communication is performed between the AP 101 and the STA 102 (e.g. as in step 312, FIG. 3).

Figure 7:
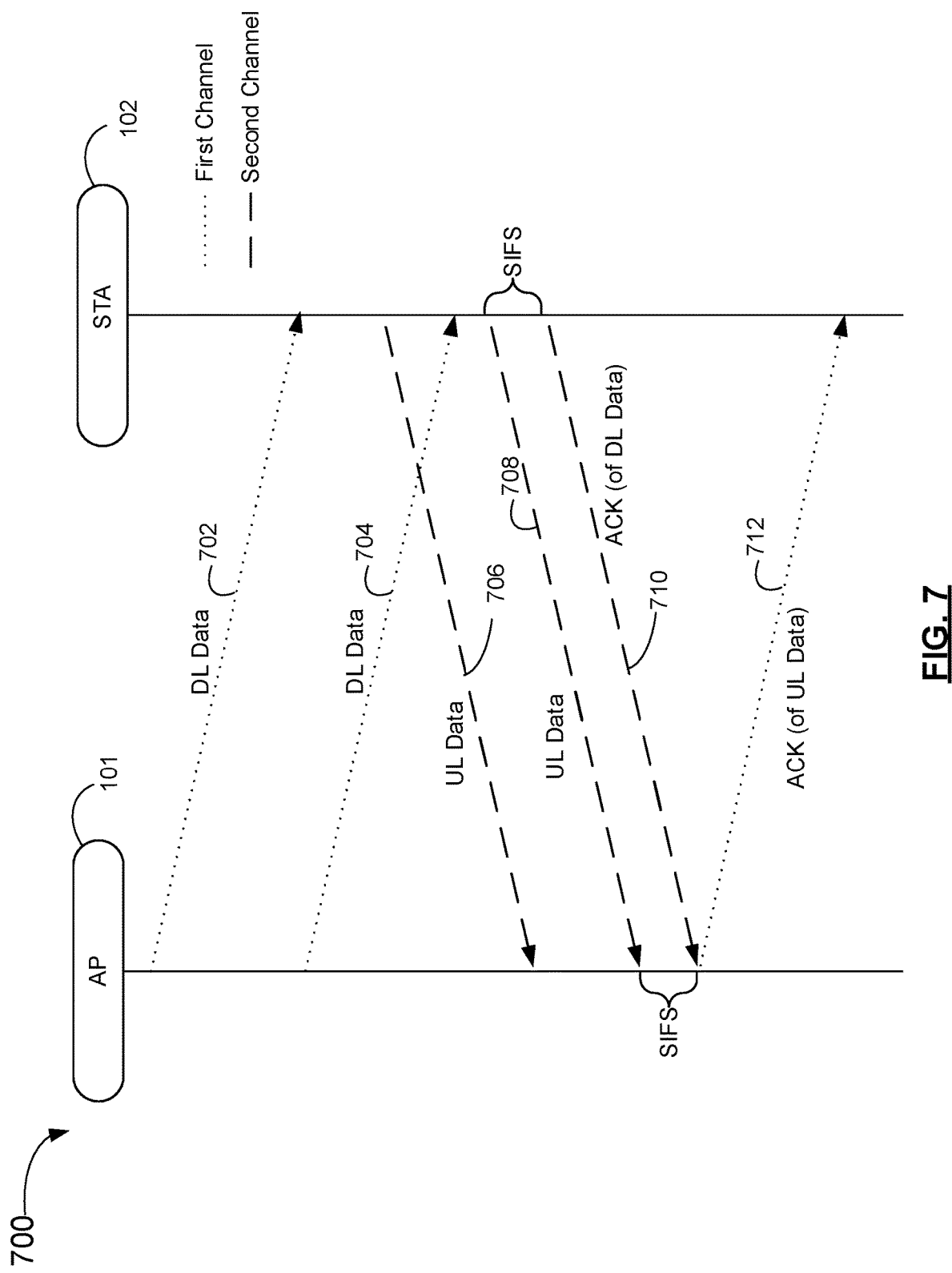
FIG. 7 is an example method in the form of a messaging diagram between the AP and a STA for performing out-of-band FD communication, according to an example embodiment.

FIG. 7 is an example method 700 in the form of a messaging diagram between the AP 101 and a STA 102 for performing out-of-band FD communication, e.g., as in step 312 (FIG. 3), 516 (FIG. 5), 612 (FIG. 6). The method 700 includes DL and UL transmissions that overlap in time and transmitted over the first channel and the second channel. In the method 700, the AP 101 and the STA 102 have already established and protected the first channel and the second channel for the out-of-band FD communication. The method 700 can be used to communicate data and ACK frames using the out-of-band FD communication.

In some conventional systems, after receiving a PDU frame, the receiving device transmits an ACK frame (e.g., Normal ACK or BlockACK) after time unit Short Inter-Frame Space (SIFS). In some cases, a BlockACK frame is transmitted by the receiving device in response to a BlockACK Request frame.

In the example method 700 of FIG. 7, for out-of-band FD communication, the receiving wireless communication device 130 may be busy transmitting a frame in the reverse direction, and therefore may not able to send BlockACK at the typical time unit SIFS after receiving the forward frame. In the example method 700 of FIG. 7, instead the receiving wireless communication device 130 is configured to send the ACK at time unit SIFS after finishing the backward frame transmission.

At step 702, for example, the AP 101 transmits to the STA 102 a first DL PDU frame (e.g., MPDU or A-MPDU) that contains first DL data. The first DL PDU frame is transmitted over the first channel that was protected for out-of-band FD communication. At optional step 704, the AP 101 transmits to the STA 102 a second DL PDU frame (e.g., MPDU or A-MPDU) that contains second DL data. The second DL PDU frame is also transmitted over the first channel.

At step 706, overlapping with step 704, the STA 102 transmits a first UL PDU frame (e.g., MPDU or A-MPDU) that contains first UL data. The first UL PDU frame is transmitted over the second channel that was protected for out-of-band FD communication. At optional step 708, the STA 102 transmits a second UL PDU frame (e.g., MPDU or A-MPDU) that contains second UL data. The second UL PDU frame is also transmitted over the second channel.

Because the STA 102 is busy transmitting the second UL PDU frame at step 708, the STA 102 is unable to transmit the ACK at the typical time unit SIFS after receiving the second DL PDU frame.

At step 710, the second channel is now available for the STA 102 to transmit the ACK to acknowledge the first DL PDU frame and the second DL PDU frame. Accordingly, at time unit SIFS after step 708 (transmitting the second UL PDU frame), the STA 102 transmits an ACK to the AP 101. Therefore, an ACK can be transmitted at the first opportunity when the second channel is idle, at time unit SIFS.

At step 712, at time unit SIFS after receiving the second UL PDU frame at step 708, the AP 101 transmits, over the first channel, an ACK to the STA 102.

Referring generally to ACKs 710 and 712, it should be understood that the AP 101 and the STA 102 transmits its ACK at the earliest opportunity after receipt of the last data frame in the FD communication. The first device to complete its one or more data transmissions (the AP 101 in this example) must therefore wait until all data transmissions 706, 708 are received from the second device (the STA 102 in this example), and may then transmit its ACK 712 one SIFS after completing receipt of the data frames. The second device to complete its one or more data transmissions (the STA 102 in this example) cannot transmit an ACK while it is still transmitting data packets 706, 708, therefore the STA 102 must wait until one SIFS after completing its one or more transmissions before transmitting its ACK 710.

In some examples, a BlockACK request is transmitted over the first channel by the transmitter device after transmitting a series of PDU frames over the first channel. A BlockACK response is transmitted by the receiver device over the second channel when the second channel is available (idle), or at the earliest opportunity after time unit SIFS of the last transmission in one or more of a series of transmissions from the receiver device.

In an alternate example of the method 700, the steps or messages of the AP 101 are performed by the STA 102, and vice versa. In an alternate example of the method 700, the method 700 is performed between two different STAs 102 that have already established and protected between themselves the first channel and the second channel, for performing peer-to-peer out-of-band FD communication.

FIG. 8 illustrates an example method 800 implemented by a wireless communication device 130 configured to simultaneously transmit and receive wireless signals, such as the AP 101. At step 802, the wireless communication device 130 generates a control signal that includes and an identification of both a first channel for the wireless communication device 130 to transmit on and a second channel for the wireless communication device 130 to simultaneously receive on, for the out-of-band FD communication. At step 804, the wireless communication device 130 transmits the control signal in a WiFi management frame.

FIG. 9 illustrates an example method 900 implemented by a wireless communication device 130, such as the STA 102. In some examples, the wireless communication device 130 is only capable of Half Duplex communications. In other examples, the wireless communication device 130 is configured to simultaneously transmit and receive communications over two different channels to perform out-of-band FD communication. At step 902, the wireless communication device 130 receives a control signal in a WiFi management frame that includes a request for out-of-band FD communication and an identification of both a first channel for transmission in one direction (e.g. DL transmission) and a second channel for transmission in a reverse direction (e.g. UL transmission). At step 904, the wireless communication device 130 transmits a response to the control signal that accepts the request for the out-of-band FD communication. At step 906, the wireless communication device 130 protects the first channel and the second channel. In an example embodiment, the wireless communication device 130 may receive a Request-To-Send (RTS) Frame over the first channel and the second channel, and protect the first channel and the second channel by transmitting a Clear to Send (CTS) Frame over the first channel and the second channel.

FIG. 10 illustrates an example method 1000 implemented by a wireless communication device 130. At step 1002, the wireless communication device 130 determines channel availability of a first channel and a second channel. At step 1004, the wireless communication device 130 generates a control signal that identifies both the first channel and the second channel. The control signal can identify the first channel for the wireless communication device 130 to transmit on, and the second channel for the wireless communication device 130 to simultaneously receive on. At step 1006, the wireless communication device 130 transmits the control signal in a WiFi management frame. At step 1008, the wireless communication device 130 protects the first channel for the wireless communication device 130 to transmit on and protects the second channel for the wireless communication device 130 to receive on. In an example embodiment, the wireless communication device 130 may transmit a Request-To-Send (RTS) Frame over the first channel and the second channel, and receiving a Clear to Send (CTS) Frame over the first channel and the second channel, thereby having the first channel and the second channel protected for out-of-band FD communication. In an example embodiment, the wireless communication device 130 is capable of out-of-band FD communication.

Figure 11:
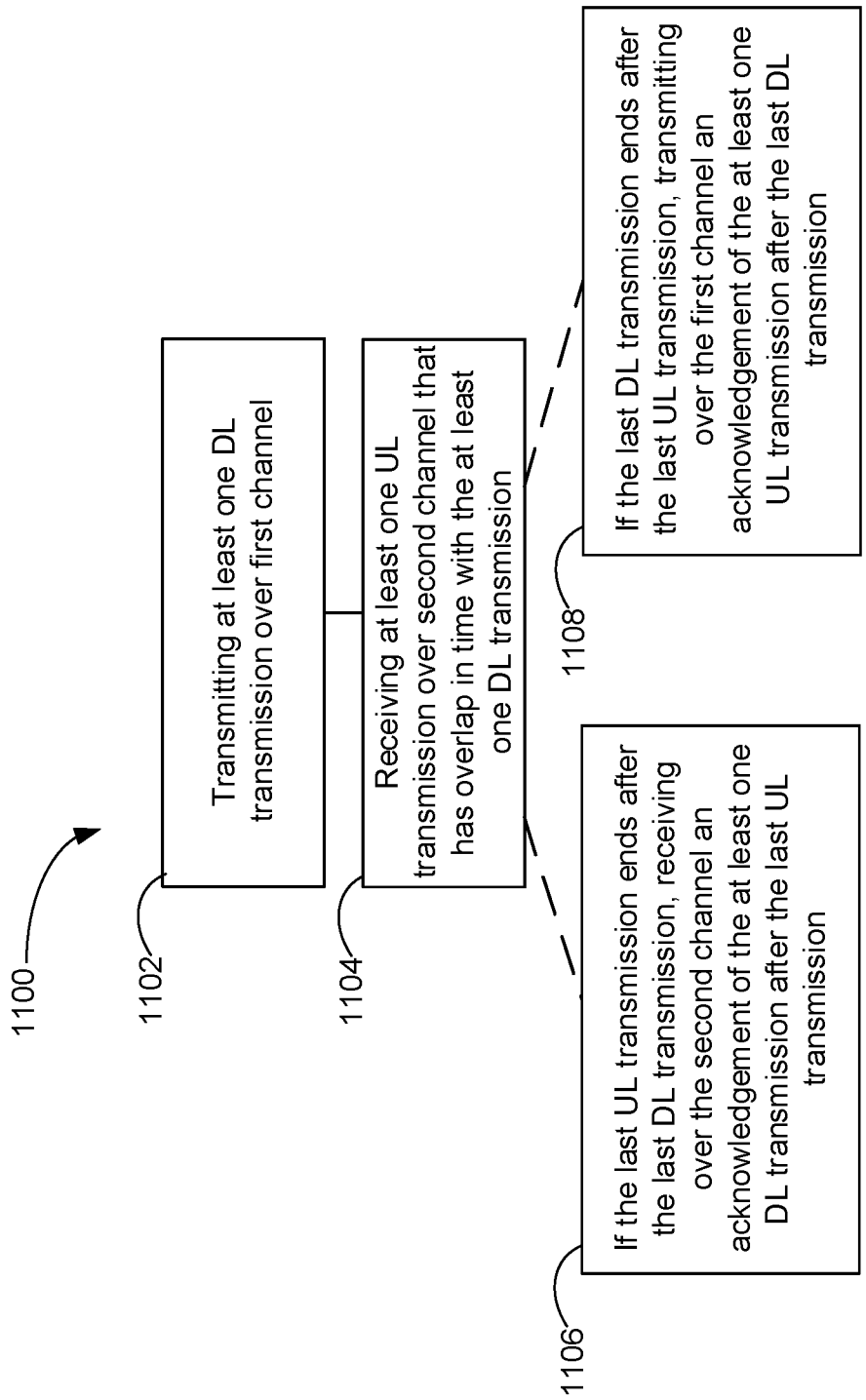
FIG. 11 illustrates an example method implemented by a wireless communication device capable of out-of-band FD communication, in accordance with an example embodiment.

FIG. 11 illustrates an example method 1100 implemented by a wireless communication device 130 capable of out-of-band FD communication, in accordance with an example embodiment. In the method 700, the wireless communication device 130 has already established and protected the first channel and the second channel for the out-of-band FD communication. At step 1102, the wireless communication device 130 transmits at least one DL transmission over the first channel. At step 1104, the wireless communication device 130 receives at least one UL transmission over the second channel. The at least one UL transmission has overlap in time with the at least one DL transmission. In an example, the wireless communication device 130 may be unable to transmit an ACK after time unit SIFS from the at least one DL transmission because the wireless communication device 130 is busy transmitting the at least one UL transmission. At step 1106, if the last UL transmission ends after the last DL transmission, the wireless communication device 130 receives, over the second channel, an acknowledgement of the at least one DL transmission after the last UL transmission. In an example embodiment, the acknowledgement is received at time unit SIFS from the last UL transmission. Continuing the example, the wireless communication device 130 transmits, over the first channel, an acknowledgement of the at least one UL transmission at time unit SIFS from the last UL transmission.

In another example, at step 1108, if the last DL transmission ends after the last UL transmission, the wireless communication device 130 transmits, over the first channel, an acknowledgement of the at least one UL transmission after the last DL transmission. In an example embodiment, the acknowledgement is received at time unit SIFS from the last DL transmission. Continuing the example, the wireless communication device 130 receives, over the second channel, an acknowledgement of the at least one DL transmission at time unit SIFS from the last DL transmission.

In some example embodiments of the method 1100, the acknowledgment can be a Normal ACK or a BlockACK.

FIG. 2 is a schematic diagram of an example wireless communication device 130, in accordance with example embodiments. For example, the wireless communication device 130 may be the AP 101 or the STA 102. The wireless communication device 130 may be used for both Single User (SU) and multiple access communications within the wireless communication network 100. Although FIG. 2 shows a single instance of each component, there may be multiple instances of each component in the wireless communication device 130 and the wireless communication device 130 could be implemented using parallel and distributed architecture. Some of the components in FIG. 2 are optional in some examples.

The wireless communication device 130 may include one or more processing devices 132, such as a processor, a microprocessor, an application-specific integrated circuit (ASIC), a field-programmable gate array (FPGA), a dedicated logic circuitry, or combinations thereof. The wireless communication device 130 may also include one or more optional input/output (I/O) interface(s) 134, which may enable interfacing with one or more optional input devices 148 and output devices 150. The wireless communication device 130 may include one or more network interfaces 136 for wired or wireless communication with a network (e.g., an intranet, the Internet, a Peer-to-Peer (P2P) network, a Wide Area Network (WAN), a wireless WAN (WWAN), a LAN, or a Radio Access Network (RAN)) or other node. Wireless networks may make use of wireless connections transmitted over an antenna 152. The network interface(s) 136 may provide multiple access wireless communication via one or more transmitters or transmit antennas and one or more receivers or receive antennas, for example. In this example, one antenna 152 is shown, which may serve for multiple access transmission or single user transmission. However, in other examples there may be multiple antennas for transmitting and receiving. In some examples, an antenna array may be used. The wireless communication device 130 may also include one or more storage units 138, which may include a mass storage unit such as a solid state drive, a hard disk drive, a magnetic disk drive or an optical disk drive.

In some example embodiments, the network interface(s) 136 and antenna 152 are collectively used to perform out-of-band FD communication and optionally FD communication, and transmit and receive communications simultaneously, either over two different channels in accordance with example embodiments, or optionally over the same channel.

The wireless communication device 130 may include one or more non-transitory memories 140 that can include physical memory 142, which may include a volatile or non-volatile memory (e.g., a flash memory, a random access memory (RAM), or a read-only memory (ROM)). The memory 140 (as well as storage unit(s) 138) may store instructions for execution by the processing device(s) 132, such as to carry out processing such as those described in the present disclosure. The memory 140 may include other software instructions, such as for implementing an operating system (OS), and other applications/functions. In some examples, one or more data sets or modules may be provided by an external memory (e.g., an external drive in wired or wireless communication with the wireless communication device 130) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

In some examples, there may be a bus 144 providing communication among components of the wireless communication device 130. The bus 144 may be any suitable bus architecture including, for example, a memory bus, a peripheral bus or a video bus. Optional input device(s) 148 (e.g., a keyboard, a mouse, a microphone, a touchscreen, or a keypad) and optional output device(s) 150 (e.g., a display, a speaker or a printer) are shown as external to the wireless communication device 130, and connected to optional I/O interface(s) 134. In other examples, one or more of the input device(s) 148 or the output device(s) 150 may be included as a component of the wireless communication device 130.

A transmitter and a receiver may be included as one or more components of the wireless communication device 130. For example, the transmitter and the receiver may be included as a single component for transmitting and receiving radio frequency (RF) analog signals. In other examples, the transmitter and the receiver may be included as two separate components for transmitting and receiving radio frequency (RF) analog signals respectively.

When the wireless communication device 130 is the AP 101, communication with selected or associated STAs 102 can be performed using the antenna 152. The processing device 132 may carry out the steps and functions described herein. When the wireless communication device 130 is a STA 102, communications with the AP 101 can be performed via the antenna 152.

The wireless communication device 130 also includes a power supply block 146 to supply power to the wireless communication device 130. In some examples, the power supply block 146 can include a battery. In some examples, the power supply block 146 includes a power adapter (e.g., AC/DC or DC/DC) for connection to an external power source and can be used for charging the battery.

In at least some examples, instructions that cause the processing device 132 to carry out methods in accordance with example embodiments are stored in storage unit(s) 138 or memory 140 of the wireless communication device 130. In some examples, the processing device 132 may be one or more controllers, which may comprise a modulator or a processor. Example systems and methods described herein, in accordance with examples, can be implemented by the one or more controllers. The one or more controllers can comprise hardware, software, or a combination of hardware and software, depending on the particular component and function. In some examples, the one or more controllers can include analog or digital components, and can include one or more processors, one or more non-transitory storage mediums such as memory storing instructions executable by the one or more processors, one or more transceivers (or separate transmitters and receivers), one or more signal processors (analog or digital), and one or more analog circuit components.

Example embodiments can applied to MU communication, single user (SU) communication, trigger based (TB) communication, or extended range (ER) TB communication.

An example embodiment is a method implemented by a wireless communication device capable of simultaneously transmitting and receiving wireless signals, the method includes: generating a control signal that includes an identification of a first channel for the wireless communication device to transmit on, and a second channel for the wireless communication device to simultaneously receive on; and transmitting the control signal in a WiFi management frame.

In an example embodiment of any of the above-described methods, the method further includes determining channel availability for the first channel and the second channel.

In an example embodiment of any of the above-described methods, the determining includes performing a Clear Channel Assessment (CCA) on the first channel and the second channel.

In an example embodiment of any of the above-described methods, the determining includes: generating a Request-To-Send (RTS) Frame and transmitting the RTS Frame over the first channel and the second channel; receiving a Clear to Send (CTS) Frame over the first channel and the second channel; and determining that the first channel and the second channel are available based on receiving the CTS Frame over the first channel and the second channel.

In an example embodiment of any of the above-described methods, the CTS Frame protects the first channel and the second channel.

In an example embodiment of any of the above-described methods, the determining includes: transmitting the control signal over the first channel; receiving a response to the control signal over the second channel; and determining that the first channel and the second channel are available based on receiving the response over the first channel and the second channel.

In an example embodiment of any of the above-described methods, one or both of the first channel and the second channel is a primary channel.

In an example embodiment of any of the above-described methods, the first channel and the second channel are each a primary channel in different bands.

In an example embodiment of any of the above-described methods, the method further includes: receiving a response to the control signal; and protecting, in response to the receiving, the first channel and the second channel.

In an example embodiment of any of the above-described methods, the method further includes: transmitting at least one first transmission over the first channel; and receiving at least one second transmission over the second channel, wherein the at least one second transmission has overlap in time with the at least one first transmission.

In an example embodiment of any of the above-described methods, the transmitting includes transmitting the at least one first transmission to a first station (STA), and the receiving includes receiving the at least one second transmission from a second STA.

In an example embodiment of any of the above-described methods, the method further includes, when a last transmission of the at least one first transmission ends after a last transmission of the at least one second transmission, transmitting an acknowledgment frame over the first channel in response to the at least one second transmission and after time unit Short InterFrame Space (SIFS) from the last transmission of the at least one transmission.

In an example embodiment of any of the above-described methods, the method further includes, when a last transmission of the at least one second transmission ends after a last transmission of the at least one first transmission, receiving an acknowledgement frame over the second channel in response to the at least one first transmission and after time unit Short InterFrame Space (SIFS) from the last transmission of the at least one second transmission.

In an example embodiment of any of the above-described methods, the transmitting of the control signal includes broadcasting the control signal or transmitting a beacon frame that includes the control signal.

In an example embodiment of any of the above-described methods, the wireless communication device is a Station (STA), an access point (AP), or a personal basic service set (PBSS) control point (PCP).

Another example embodiment is a method implemented by a wireless communication device, the method including: receiving a control signal in a WiFi management frame that includes an identification of both a first channel for transmission in one direction and a second channel for simultaneous transmission in a reverse direction; transmitting a response to the control signal; and protecting the first channel and the second channel.

In an example embodiment of any of the above-described methods, the receiving includes receiving the control signal from a second wireless communication device, wherein the protecting includes protecting the first channel and the second channel for communication between the wireless communication device and the second wireless communication device.

In an example embodiment of any of the above-described methods, the protecting excludes use of the first channel and the second channel by devices other than the wireless communication device and the second wireless communication device.

In an example embodiment of any of the above-described methods, the first channel and the second channel is protected for any wireless communication devices that responds to the control signal.

In an example embodiment of any of the above-described methods, the method further includes receiving a Request-To-Send (RTS) Frame over the first channel and the second channel, wherein the protecting includes transmitting a Clear to Send (CTS) Frame over the first channel and the second channel.

In an example embodiment of any of the above-described methods, the receiving includes receiving the control signal over the first channel and the second channel, and the transmitting includes transmitting the response over the first channel and the second channel.

In an example embodiment of any of the above-described methods, the method further includes: receiving at least one first transmission over the first channel; and transmitting at least one second transmission over the second channel, wherein the at least one second transmission has overlap in time with the at least one first transmission.

In an example embodiment of any of the above-described methods, the method further includes, when a last transmission of the at least one second transmission ends after a last transmission of the at least one first transmission, transmitting an acknowledgement frame over the second channel in response to the at least one first transmission and after time unit Short InterFrame Space (SIFS) from the last transmission of the at least one second transmission.

In an example embodiment of any of the above-described methods, the method further includes, when a last transmission of the at least one first transmission ends after a last transmission of the at least one second transmission, receiving an acknowledgement frame over the first channel in response to the at least one second transmission and after time unit Short InterFrame Space (SIFS) from the last transmission of the at least one first transmission.

An example embodiment is a wireless communication device, comprising an antenna; a processing device; a memory associated with the processing device for storing instructions that when executed by the processing device causes the processing device to perform any of the described methods, processes or functions.

An example embodiment is a non-transitory computer-readable medium which stores instructions that when executed by a processing device causes the processing device to perform any of the described methods, processes or functions.

An example embodiment is a non-transitory computer-readable medium which stores instructions that when executed by a processing device causes the processing device to perform any of the described methods, processes or functions.

The example embodiments described above may be implemented by using hardware only or by using software and a necessary universal hardware platform. Based on such understandings, the technical solution of some example embodiments may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the example embodiments. The software product may additionally include a number of instructions that enable a computer device to execute operations for configuring or programming a digital logic apparatus in accordance with example embodiments.

Example apparatuses and methods described herein, in accordance with example embodiments, can be implemented by one or more controllers. The controllers can comprise hardware, software, or a combination of hardware and software, depending on the particular application, component or function. In some example embodiments, the one or more controllers can include analog or digital components, and can include one or more processors, one or more non-transitory storage mediums such as memory storing instructions executable by the one or more processors, one or more transceivers (or separate transmitters and receivers), one or more signal processors (analog and/or digital), and/or one or more analog circuit components.

In the described methods or block diagrams, the boxes may represent events, steps, functions, processes, modules, messages, and/or state-based operations, etc. Although some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The example embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to include all suitable changes in technology.

The specification and drawings are, accordingly, to be regarded simply as an illustration, and are contemplated to cover any and all modifications, variations, combinations or equivalents.

What is claimed is:

1. A method implemented by a wireless communication device capable of simultaneously transmitting and receiving wireless signals, the method comprising:
   generating a control signal that identifies a first channel for the wireless communication device to transmit on, and a second channel for the wireless communication device to simultaneously receive on while transmitting on the first channel, wherein the first channel and the second channel are primary channels in two different bands, the two different bands being separate and distinct from one another; and
   transmitting the control signal in a WiFi management frame.

2. The method as claimed in claim 1, further comprising determining channel availability for the first channel and the second channel.

3. The method as claimed in claim 2, wherein the determining includes performing a Clear Channel Assessment (CCA) on the first channel and the second channel.

4. The method as claimed in claim 2, wherein the determining includes:
   generating a Request-To-Send (RTS) Frame and transmitting the RTS Frame over the first channel and the second channel;
   receiving a Clear to Send (CTS) Frame over the first channel and the second channel; and
   determining that the first channel and the second channel are available based on receiving the CTS Frame over the first channel and the second channel.

5. The method as claimed in claim 4, wherein the CTS Frame protects the first channel and the second channel.

6. The method as claimed in claim 2, wherein the determining includes:
   transmitting the control signal over the first channel;
   receiving a response to the control signal over the second channel; and
   determining that the first channel and the second channel are available based on receiving the response over the first channel and the second channel.

7. The method as claimed in claim 1, further comprising:
   receiving a response to the control signal; and
   protecting, in response to the receiving, the first channel and the second channel.

8. The method as claimed in claim 1, further comprising:
   transmitting at least one first transmission over the first channel; and receiving at least one second transmission over the second channel, wherein the at least one second transmission has overlap in time with the at least one first transmission.

9. The method as claimed in claim 8, wherein the transmitting includes transmitting the at least one first transmission to a first station (STA), and the receiving includes receiving the at least one second transmission from a second STA.

10. The method as claimed in claim 8, further comprising, when a last transmission of the at least one first transmission ends after a last transmission of the at least one second transmission, transmitting an acknowledgment frame over the first channel in response to the at least one second transmission and after time unit Short InterFrame Space (SIFS) from the last transmission of the at least one first transmission.

11. The method as claimed in claim 8, further comprising, when a last transmission of the at least one second transmission ends after a last transmission of the at least one first transmission, receiving an acknowledgement frame over the second channel in response to the at least one first transmission and after time unit Short InterFrame Space (SIFS) from the last transmission of the at least one second transmission.

12. The method as claimed in claim 1, wherein the transmitting of the control signal includes broadcasting the control signal or transmitting a beacon frame that includes the control signal.

13. The method as claimed in claim 1, wherein the wireless communication device is a Station (STA), an access point (AP), or a personal basic service set (PBSS) control point (PCP).

14. The method of claim 1, wherein a lower band of the two different bands is at least 2.4 GHz, or wherein at least one of the two different bands includes at least ii channels.

15. The method of claim 1, wherein the first channel and the second channel are in two different non-licensed bands.

16. A method implemented by a wireless communication device, the method comprising:
receiving a control signal in a WiFi management frame that identifies both a first channel for transmission in one direction and a second channel for simultaneous reception in a reverse direction, wherein the first channel and the second channel are primary channels in two different bands, the two different bands being separate and distinct from one another;
transmitting a response to the control signal; and
protecting the first channel and the second channel.

17. The method as claimed in claim 16, wherein the receiving includes receiving the control signal from a second wireless communication device, wherein the protecting includes protecting the first channel and the second channel for communication between the wireless communication device and the second wireless communication device.

18. The method as claimed in claim 17, wherein the protecting excludes use of the first channel and the second channel by devices other than the wireless communication device and the second wireless communication device.

19. The method as claimed in claim 16, wherein the first channel and the second channel are protected for any wireless communication devices that responds to the control signal.

20. The method as claimed in claim 16, further comprising receiving a Request-To-Send (RTS) Frame over the first channel and the second channel, wherein the protecting includes transmitting a Clear to Send (CTS) Frame over the first channel and the second channel.

21. The method as claimed in claim 16, wherein the receiving includes receiving the control signal over the first channel and the second channel, and the transmitting includes transmitting the response over the first channel and the second channel.

22. The method as claimed in claim 16, further comprising:
receiving at least one first transmission over the first channel; and
transmitting at least one second transmission over the second channel, wherein the at least one second transmission has overlap in time with the at least one first transmission.

23. The method as claimed in claim 22, further comprising, when a last transmission of the at least one second transmission ends after a last transmission of the at least one first transmission, transmitting an acknowledgement frame over the second channel in response to the at least one first transmission and after time unit Short InterFrame Space (SIFS) from the last transmission of the at least one second transmission.

24. The method as claimed in claim 22, further comprising, when a last transmission of the at least one first transmission ends after a last transmission of the at least one second transmission, receiving an acknowledgement frame over the first channel in response to the at least one second transmission and after time unit Short InterFrame Space (SIFS) from the last transmission of the at least one first transmission.

25. A wireless communication device, comprising:
an antenna;
a processing device;
a memory associated with the processing device for storing instructions that when executed by the processing device causes the processing device to:
generate a control signal that identifies a first channel for the wireless communication device to transmit on, and a second channel for the wireless communication device to simultaneously receive on while transmitting on the first channel, wherein the first channel and the second channel are primary channels in two different bands, the two different bands being separate and distinct from one another; and
transmit the control signal in a WiFi management frame.

26. A non-transitory computer-readable medium which stores instructions that when executed by a wireless communication device causes the wireless communication device to perform operations including:
generating a control signal that identifies a first channel for the wireless communication device to transmit on, and a second channel for the wireless communication device to simultaneously receive on while transmitting on the first channel, wherein the first channel and the second channel are primary channels in two different bands, the two different bands being separate and distinct from one another; and
transmitting the control signal in a WiFi management frame.

* * * * *

UNITED STATES PATENT AND TRADEMARK OFFICE
CERTIFICATE OF CORRECTION

PATENT NO. : 11,425,753 B2
APPLICATION NO. : 16/555848
DATED : August 23, 2022
INVENTOR(S) : Osama Aboul-Magd et al.

It is certified that error appears in the above-identified patent and that said Letters Patent is hereby corrected as shown below:

In the Claims

Claim 14, Column 23, Line 36; delete "ii" and insert --11--.

Signed and Sealed this
Twenty-seventh Day of September, 2022

Katherine Kelly Vidal
*Director of the United States Patent and Trademark Office*